United States Patent
Charuk et al.

(10) Patent No.: US 7,333,943 B1
(45) Date of Patent: Feb. 19, 2008

(54) METHOD AND SYSTEM FOR MANAGING REAL PROPERTY TRANSACTIONS HAVING INTERNET ACCESS AND CONTROL

(75) Inventors: James Michael Charuk, Sugar Land, TX (US); Russell Neill Capper, Houston, TX (US); Samuel Waldon Jumper, Katy, TX (US); Sean Allan Cafferky, Houston, TX (US)

(73) Assignee: The Prudential Insurance Company of America, Newark, NJ (US)

( * ) Notice: Subject to any disclaimer, the term of this patent is extended or adjusted under 35 U.S.C. 154(b) by 558 days.

(21) Appl. No.: 09/637,296

(22) Filed: Aug. 11, 2000

(51) Int. Cl.
G06Q 30/00 (2006.01)
(52) U.S. Cl. .......................... 705/26; 705/27
(58) Field of Classification Search .............. 705/26, 705/27
See application file for complete search history.

(56) References Cited

U.S. PATENT DOCUMENTS

| | | | |
|---|---|---|---|
| 5,283,731 A | 2/1994 | Lalonde et al. | |
| 5,584,025 A | 12/1996 | Keithley et al. | |
| 5,664,115 A | 9/1997 | Fraser | |
| 5,781,773 A | 7/1998 | Vanderpool et al. | |
| 5,974,406 A | 10/1999 | Bisdikian et al. | |
| 6,029,141 A | 2/2000 | Bezos et al. | |
| 6,115,694 A * | 9/2000 | Cheetham et al. | 705/10 |
| 6,134,534 A | 10/2000 | Walker et al. | |
| 6,185,683 B1 | 2/2001 | Ginter et al. | |
| 6,247,047 B1 | 6/2001 | Wolff | |
| 6,321,202 B1 * | 11/2001 | Raveis, Jr. | 705/1 |
| 6,484,176 B1 * | 11/2002 | Sealand et al. | 707/10 |
| 6,594,633 B1 | 7/2003 | Broerman | |
| 6,684,196 B1 * | 1/2004 | Mini et al. | 705/26 |
| 6,751,596 B1 * | 6/2004 | Hastings | 705/10 |
| 2001/0041053 A1 | 11/2001 | Abecassis | |
| 2002/0095385 A1 * | 7/2002 | McAvoy et al. | 705/51 |
| 2003/0083957 A1 * | 5/2003 | Olefson | 705/27 |

\* cited by examiner

Primary Examiner—Mark Fadok
(74) Attorney, Agent, or Firm—Osha Liang LLP

(57) ABSTRACT

A system and method for managing real estate transactions over the Internet are disclosed. The method includes placing real property market-specific listing data in a user-accessible Internet accessible database, searching the database using search parameters input by a user from an Internet-connected terminal, and displaying to the user on a secure web page any real property listings which match the search parameters. One embodiment includes displaying, on the web page, links to the database for the matching listings. One embodiment includes initiating a user account for the user prior to entering the search parameters. One embodiment includes initiating a portfolio for the user, wherein the user selects ones of the displayed real property listings to add to the portfolio. One embodiment includes the user entering an appointment request for at least one of the listings in the portfolio at the Internet-connected terminal, determining whether a time in the appointment request matches times listed as available, and if such time is available posting on an agent terminal a viewing appointment. One embodiment includes the user entering offer to purchase data for a listing in the portfolio in the Internet-connected terminal, posting the offer data at a transaction coordinator terminal, if any of the offer data are legally deficient, generating an e-mail message identifying the deficiency and transmitting the deficiency e-mail message to the user, if any of the offer data are legally deficient, correcting any such deficiency, and generating an offer for sale document using a market-specific template.

13 Claims, 9 Drawing Sheets

FIG. 2 get started 3 easy steps. ① ②
Follow the directions at each step.
Use our agents and get cash back.

It's an easy 3-step process to access eRealty.com's private password-protected intranet for home buyers.

Simply follow the brief directions for each of the steps below and press "Register Me" at the bottom to get full access to all the services and benefits aRealty.com has to offer.
(Note: Already registered? Logon here.)

Want more information about eRealty.com? Learn more!

① The State of Texas requires us to provide you, the home buyer, with information about real estate brokerages and how they operate. Please take a minute to read this information before continuing.

Before working with a real estate broker, you should know that the duties of a broker depend on whom the broker represents. If you are a prospective seller or landlord (owner) or a prospective buyer or tenant (buyer),

☐ I HAVE READ    VIEW AS PDF (Note: You must check "I HaveRead" in order to continue.)

- Welcome
- How To Use This Site
- Buyer Rebate
- Logon
- Homefinder
- New Listing Alert
- My Portfolio
- Neighborhood Facts
- Schedule Home Tours
- Financing
- Make An Offer
- Steps To Closing
- Education Center
- Contact eRealty.com
- About eRealty.com

FIG. 3

(2) Terms of Use Agreement - Outlines the terms and conditions for using eRealty.com and establishing eRealty Inc. as your broker. Please take a minute to read this information and agree before continuing.

This agreement is between eRealty Inc. ("Broker") and the eRealty.com website visitor ("User") as entered in the name field on the Registration Section below.

☐ I AGREE  for  [5 Days ▼]
[I DISAGREE]  [VIEW AS PDF]

(Note: You must check "I Agree" in order to continue.)

FIG. 4

(3) Once you have read the Brokerage information and have agreed to our terms of use agreement, then we only need a few pieces of information about you to get started.

First Name: [ ]
Last Name: [ ]
E-Mail Address: [ ]
Enter Password: [ ]
Re-enter Password: [ ]

How did you find eRealty.com?
○ Billboard/Outdoors  ○ Internet    ○ Mailer
○ Magazine            ○ Newspaper   ○ TV
○ Word of Mouth       ○ Yard Sign   ○ Other If other, please specify: [ ]

Promo Code [ ]

[REGISTER ME]

(Note: Your new account information and password will be confirmed by email.)

METHOD AND SYSTEM FOR MANAGING REAL PROPERTY TRANSACTIONS HAVING INTERNET ACCESS AND CONTROL

BACKGROUND OF THE INVENTION

1. Field of the Invention

This invention relates to the operation of residential real estate brokerages. More specifically, the invention relates to software and information processing methods and systems required to facilitate buying and selling of residential real estate using public Internet access to a virtual office computing environment.

2. Description of the Related Art

Residential real estate brokerages generally use a diverse set of computing technology. In some cases, personal computer-based software is used as contact management for agents, or for business form entry, storage and retrieval. Other software is used by brokers and agents to access local residence listing data services, such as the Multiple Listing Service-MLS® (MLS® is a mark of The National Association of Realtors, Inc.) database system to obtain information on homes listed with MLS database subscribers (typically licensed real estate brokers) as being offered for sale. Still other software is used to perform office functions, such as accounting and payroll. Some real estate brokers have Internet websites (sites on the World Wide Web, referred to herein as "web") used for the purpose of advertising their "listing information" (data on properties offered for sale through the respective brokerage) to the public. Typically, brokerage organizations having multiple-brokerage offices in various locations throughout the country will try to standardize the software used in each of their offices.

Within each brokerage office in an organization having a plurality of such offices, a limitation to using a diverse set of software tools is that information stored in one software system may be desirable to be used in another software. For example, client contact information may be used later as customer information entered on "offer-for-sale" forms. In order to maintain information continuity, current methods of storing data in a brokerage office typically require hard-copy (paper) files. It is quite common for brokerage organizations to maintain an administrative staff entirely for the purpose of maintaining customer records in such files. Lack of ability to use data stored in a single location for multiple purposes hinders the ability of a multi-office brokerage to manage its operations and consolidate its financial management.

Agent efficiency is another issue related to the ability to use customer data for multiple purposes. Real estate agents spend considerable time "showing" homes to prospective buyers, keeping track of which homes that were shown to particular prospective buyers, and scheduling appointments to show these homes to prospective buyers. Prospective buyers may find it inconvenient to use an agent for scheduling home viewing appointments because prospective buyers have no way to determine whether they are making a viewing selection from the entire pool of properties offered for sale, or the ones the agent himself has selected from the pool. Often, prospective buyers find it inconvenient to keep accurate records detailing which homes have been viewed, particularly after a continuous session of viewing a large number of homes.

The process of completing a residential real estate sale transaction is laden with forms. In most cases, each of these forms contains information that is common to all the forms required to complete a sale transaction. The agent is typically responsible for obtaining information accompanying an offer to buy, and acceptance of the offer to buy (typically embodied on a standard residential real estate sales contract form). However, to complete the sale transaction (known in the art as "closing" the transaction), dozens of other forms are required by third parties to the transaction. Third parties include mortgage providers, title insurance providers, casualty insurance providers and inspection service providers, among others. Many buyers are overwhelmed by the closing process and typically close a transaction without really knowing which forms they have signed, or what contract terms have been agreed to, just to get the transaction completed. Because of the number of such forms involved, it is estimated that between five and fifteen percent of the cost of each major service (such as those listed above) in any transaction are attributable merely to document transcription and document courier costs. These costs consist of, among other things data on forms being entered into computer systems, and documents being transported from the point of origination to a processing location.

What is needed is a system which stores data on properties offered for sale, as well as customer data, in a location which is commonly accessible by all entities having an interest in the transaction.

SUMMARY OF THE INVENTION

One aspect of the invention is a method for managing real estate transactions, particularly over the Internet. The method includes placing real property market-specific listing data in a user-accessible Internet accessible database, searching the database using search parameters input by a user from an Internet-connected terminal, and displaying to the user on a secure web page any real property listings which match the search parameters.

One embodiment of the invention includes displaying, on the web page, links to the database for the matching listings wherein the links direct the user to more detailed information about the matching properties. One embodiment includes initiating a user account for the user prior to presenting the detailed information. One embodiment includes initiating a portfolio for the user, wherein the user selects ones of the displayed real property listings to add to the portfolio. One embodiment includes the user entering an appointment request for at least one of the listings in the portfolio at the Internet-connected terminal, determining whether a time in the appointment request matches times listed as available, and if such time is available posting on an agent terminal a viewing appointment. One embodiment includes the user entering offer to purchase data for a listing in the portfolio in the Internet-connected terminal, posting the offer data at a transaction coordinator terminal, if any of the offer data are legally deficient, generating an e-mail message identifying the deficiency and transmitting the deficiency e-mail message to the user, if any of the offer data are legally deficient, correcting any such deficiency, and generating an offer for sale document using a market-specific template.

Another aspect of the invention is a method for managing real estate transactions over the Internet, including a user entering data including at least an address for a property to be listed as offered for sale in an Internet connected terminal, entering the user entered data into a database, searching the database for complementary listing data on the property to be listed, and displaying data entry fields to the user. The data entry fields include elements of the complementary listing data not found for the property in the database.

In one embodiment, the database include information from previously sold properties. In one embodiment, the complementary listing data includes at least one selected from structure area, number of bedrooms, number of bathrooms, total number of rooms and garage spaces. In one embodiment, the complementary listing data comprises at least one selected from school district, real property taxes and subdivision in which the property is located.

In another embodiment, the method in this aspect includes posting the property to be listed to an Agent desktop. The Agent desktop is also accessible from a secure Internet connected terminal.

In one embodiment, the method includes generating a listing contract form for the property to be listed, and posting the listing contract form to the Agent desktop. In a particular embodiment, the listing contract is generated from a market specific template.

In one embodiment, the method includes transmitting the listing contract form to the user for execution. Transmitting can be one selected from generating an electronic mail message, generating a facsimile message and printing a copy at a computer accessing the Agent account.

In one embodiment, the method includes posting appointments to view the property to be listed to an Agent desktop. In one embodiment, the appointments are determined by at least one prospective buyer viewing selected data on the property from an Internet connected terminal and entering a selected appointment time.

Another aspect of the invention is a system for managing real estate transactions including an application server operatively coupled to the Internet and operatively coupled to a database. The application server is adapted to present to a user logged on to a respective Internet connected terminal identified as an agent at least a list of properties offered for sale by a broker and a schedule of viewing appointments for each property on the list. The application server is adapted to present to a user logged on to a respective Internet connected terminal identified as a buyer of a real property at least a data entry field for search criteria for real properties having data thereon stored in the database. The applications server is adapted to search the database and return to the user identified as a buyer on the respective terminal at least a number of properties matching the search criteria. The application server is adapted to present to a user logged on to a respective Internet connected terminal identified as a seller of a real property at least a number of requests to view the real property entered by other users logged on to other respective Internet connected terminals identified as buyers. The database is adapted to receive and store data on properties listed as offered for sale by a broker. The data include at least an address of each property listed for sale. The database is also adapted to receive and store at least a name and a contact means for each user identified as a buyer. The database is also adapted to receive and store at least a name, a contact means and an address of a property listed for sale for each user identified as a seller.

Other aspects and advantages of the invention will be apparent from the description which follows.

BRIEF DESCRIPTION OF THE DRAWINGS

FIG. 2 shows one example of a data entry web page for registering a new user to the system.

FIG. 3 shows one example of a "Terms of Use" statement web page to be presented to a user at the time of registration of a new user.

FIG. 4 shows one example of a personal data entry web page to be presented to a user at the time of registration of a new user.

DETAILED DESCRIPTION

Figure 1:
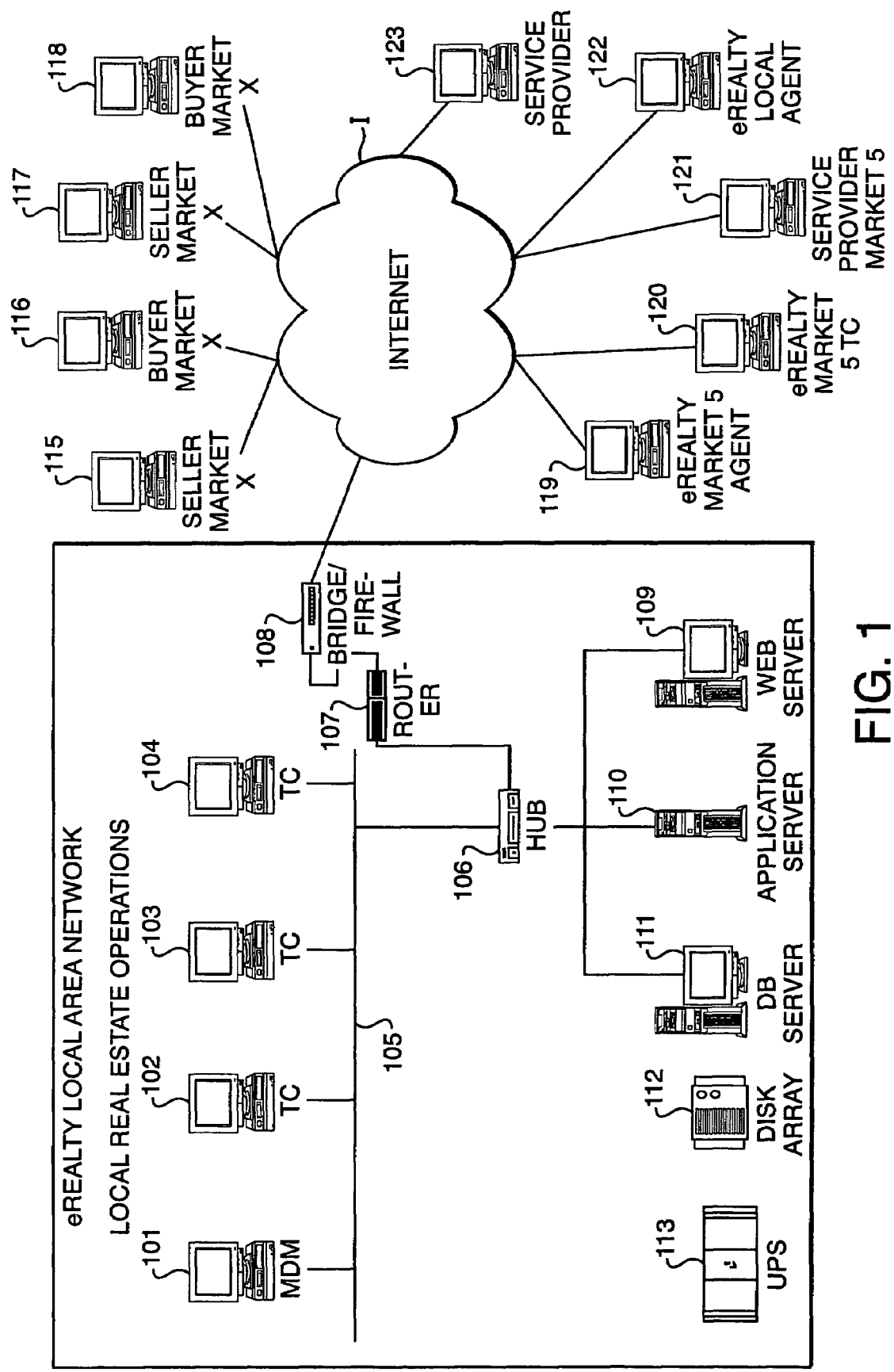
FIG. 1 shows one implementation of a system according to the invention.

1. Overview of Residential Real Property Transactions and how they Relate to the Invention Generally speaking, the invention provides a software system and a method for enabling a residential real estate brokerage entity (hereinafter called the "broker") to have a centralized computing environment to service multiple real estate transactions. The system is capable of operating in multiple markets, while requiring only one physical office (although the number of markets and number of physical offices does not limit the scope of the invention). The invention facilitates residential real estate transactions for buyers, sellers and third party service providers from the beginning to closing each real property sale transaction.

From the broker's perspective, for a property buyer (hereinafter called the "Buyer"), the transaction process begins when the Buyer begins looking for a property, or needs assistance in understanding the real estate purchase transaction process. Also from the broker's perspective, for a property seller, (hereinafter called the "Seller"), the transaction process begins when the Seller either makes a decision to sell a real property, or begins to research the fair market value of a particular real property. The transaction process ends when both the Buyer and Seller are successfully relocated. For the Buyer this means having moved his personal effects (and typically his primary residence) into the property which forms the subject of the transaction, and for the Seller having this means given up title to and possession of the property. The transaction process includes the mediation and assistance of licensed real estate agents local to both the Buyer and the Seller and central to the brokerage business.

A centralized computing facility ("the system"), which can be equipped with commercially available computer hardware and software, according to the invention can be accessed through standard Internet connections (such as by personal computer connected to a telephone line connected to an Internet service provider) and any web browser known in the art. Secure access to the system is provided through password-protected entry, and for sensitive information transmissions, through a Secure Socket Layer ("SSL") server. The system is based on a client-server model utilizing web technology to construct its application sets. Each user (which can be the broker, an Agent, a Buyer, a Seller or a third party service provider), regardless of the user's role in the real estate sale transaction, can use a standard web browser and a standard Internet connection as the user's primary interface to the system. This provides, among other benefits, a high degree of flexibility in the physical location of the various users in the system. As previously explained, the system can operate in more than one real estate market while having only one physical office. Similarly, employees of the broker (e.g., Agent, Transaction Coordinator, Market Development Manager) may have access to any and all of their work-related information and applications at any physical location at which an Internet connection is available.

The system provides selected application program sets to each user based upon a defined role for each user. A Buyer, for example, gains access to a set of applications that are generally required by a buyer of residential real estate. Similarly, each other "role", in the transaction including the Seller, for example, the real estate agent ("Agent"), a transaction coordinator ("TC", which will be explained later) has his own application set. Within the broker organization each geographic area defined by the broker (referred to as a "market"), which may be managed by a market manager, has an hierarchy of roles, beginning with the brokerage management, the market manager, the market TC, and Agents assigned to the particular market. In this embodiment of the invention, each level within the role hierarchy can have increasing capabilities and focus within the associated application set. In one embodiment of the invention, the main focus of the market manager, for example, is to manage the inventory of listings (properties offered for sale within the particular market by the broker), and to manage the activities of the TC's and Agents assigned to the particular market. In this embodiment, the market manager's application set may also contain all the functionality of the TC's application set as a redundancy and convenience feature. The TC's application set in this embodiment may contain all the functionality of the Agent's application set as a redundancy and convenience feature.

The system, in this embodiment of the invention, begins to facilitate the sales transaction process through interaction with buyers and sellers via the broker's public web site. Access to public information on the web site leads the buyer or seller to register (automated account creation process) as a customer of the broker. Registration as a customer links the buyer or seller into the broker's private web site where the buyer or seller may have "account" access via "userid" and password entry.

Once registered, a buyer (after registering to become a Buyer as defined herein) can have access to the MLS database information (generally all active listings in the particular market). The MLS database information is provided to registered Buyers by the system through a search mechanism based on the Buyer-entered search criteria including selected type of property and a geographic reference. The Buyer can then browse the listings in the MLS database on the private website. The Buyer may "tag" selected ones of the listings, where the tagged listings will be stored in a Buyer's "account portfolio". From the portfolio, a Buyer can schedule home showings, make offers to buy, and can select certain third-party services and providers of those services. For particular third-party service providers, documents which will be executed at the transaction closing can be available for previewing through their account.

Through the system's 'New Listing Alert', a Buyer can enter and store selected property search criteria. The system will alert the Buyer, via e-mail, when a new listing comes on the market that meets the selected search criteria. The criteria can be changed at any time by the Buyer to suit his personal preferences. Similarly, a 'Portfolio Alert' feature of the system notifies the Buyer by e-mail when a home in their portfolio changes status (for example from 'for sale' to 'sold', or 'pending' to 'for sale') or when a price change occurs. Each of these alerts can selected by the Buyer to be active or inactive to suit his personal preference.

When a seller registers as a customer of the broker, the seller (who then becomes a "Seller" as that term is used herein) can, among other functions, conduct market valuations of the property the Seller wishes to list for sale by the broker. Registration as a Seller typically includes agreeing to use the broker as the "listing" broker for the particular property. The listed property is digitally represented on the broker's web site. In one embodiment of the invention, the Seller may receive periodically updated (e.g. daily, weekly and/or monthly) reports on web site activity on the listed property. These reports may include feedback (comments) from Buyers who have made visits to the home, and 'Listing Alerts' that notify the Seller of sales activity (such as listings and/or closings of sales of other properties) in the vicinity of the listed property. The Seller may also, on-line, receive and review offers to purchase the listed home, may present counter offers or accept the presented offers, and may preview transaction closing documents from particular service providers.

In this embodiment Buyers and Sellers are assisted by the TC in several ways. The business model of this embodiment defines a central location where technical and real estate professionals can have an office in a common area referred to as a "call center". This allows broker entity personnel to handle any customer service calls generated either from the web site or from other contact methods such as the telephone or facsimile transmission. The TC acts as a call center customer service representative. The TC may be physically located other than in a call center. Because any user can access the system through the Internet with the proper user identification, a TC might be local to a particular market, but may also be located in a different market. The system allows the TC to view all details in the Buyers' and Sellers' accounts. The system provides the TC with the ability to assist the Buyer and Seller in ordering third party closing-related services, in making appointments for them, and in providing them with scheduling information. TC's can receive call-back requests through the system and respond to online chat requests when specific real estate or system questions arise through a Buyer or Seller session on the system web site. The TC also has the ability to schedule events for Agents in the Agents' respective markets. The events include showing, closing and listing appointments all of which can be scheduled for the Agents by a TC.

In the present embodiment, the Agent interacts with the system for all personal contact, all scheduling, all real estate forms manipulation, and for all customer (Buyer and Seller) assistance functions. The system provides the Agent with access to all customer account information for customers assigned to him/her by a TC. The system can create property brochures, listing appointment packages, and comparative market analysis reports for each Buyer. The Agent can be notified, via e-mail, or wireless telephone for example, of status updates on the Agent's calendar, or through an active pager or wireless telephone interface of any system-scheduled event requiring the Agent's immediate attention. Such events could include, for example, a pending showing appointment, a change in scheduling or simply a reminder of an event.

For any third party service provider (referred to hereinafter as "SP"), the system provides both a web site presence and provides electronic service ordering and service status reporting capability. A presence is a set of distinct "pages" on the broker's web site that allows a system user (typically a Buyer or Seller) to become acquainted with the services provided by each SP. Each SP that has a presence on the system maintains a communications profile that the system uses to communicate with the particular SP. The most advanced level of communication is a defined electronic data interchange that allows services to be ordered and service status to be updated over the Internet. The electronic data interchange is bi-directional so that Buyers and Sellers can view the status of their service orders. The lowest level of communications is called "on-behalf-of" communications. On behalf of communications sends information to the TC, such as by telephone, for manual processing by the TC. Other communication levels include automated fax and e-mail message transmission.

For the broker, data and information integration provides strong business management capabilities. Very useful market information coupled with sales statistics, Agent efficiencies and inventories allow the broker to manage personnel, advertising budgets and the overall business. Web based statistics and user account information provides immediate feedback on advertising methods and costs of capture for each customer.

When referring to the system architecture, comments are confined to the hardware and software configuration that are designed to provide direct computing resources for a residential real estate brokerage. The system illustrated in FIG. 1 is comprised of standard commercial hardware and software with particular software applications designed for the invention. The core of the system is designed around a set of servers that are task specific. The design is common and based upon shared networked appliances that can be externally accessed through gateway devices connected to the public Internet, through an Internet service provider ("ISP"). Each core server executes a task or set of tasks that provide a portion of the entire system functionality. The mail server handles the electronic mail, the web server serves the Internet web page requests, the database server houses and serves information from the database and so on. Task segmentation is an important aspect of the architecture of any client/server based system Internet/Intranet users can access the system via a standard web browser from any device that runs this type of software. Applications (web page sets) are served from a web server, but are constructed using whichever server resources in the system are required by the application. The system utilizes standard HTTP to communicate between the client browser and the web server.

2. Description of the System According to the Invention

To aid in a complete understanding of the invention, the description of the system is arranged within the following sections:

A. Glossary of Terms
B. Overview of the System and its Components
C. Data Assimilation
D. Customer Registration
E. Property Searching
F. Viewing Appointment Requests
G. Making an Offer to Purchase
H. Services Transaction Management
I. Listing Services
J. Transaction Coordinator (TC) Desktop and Event Scheduling
K. Market Manager Desktop and Inventory Management
L. Market Management
M. Administration
N. Conclusion
A. Glossary of Terms Telephony Server—The system has an integrated telephony server that facilitates communication (facsimile and voice) both inside and outside the brokerage organization. The server is integrated with an e-mail server and allows desktop control of all communications aspects of the system. Each communication event is logged on a user console and is distributed through an exchange server to each individuals email client. In this manner all e-mail, voice mail and faxes show up in a users "inbox" for that mail client. The server can be a central processing unit (CPU) such as one made by Intel, Inc. running software sold by Microsoft, Inc. under the trade name "Windows NT 4". The server may have some third-party ISA boards and software that integrates the digital communications lines from the outside to the internal phone and mail system.

Mail Server—This server runs server software sold by Microsoft, Inc. under the trade name "Microsoft Exchange" to facilitate its electronic mail. Although most users will have software sold by Microsoft, Inc. under the trade name "Outlook" or "Outlook Express" for e-mail service, any POP3 capable client can be served. This system is also an Intel-made CPU running the Microsoft, Inc. software known by the trade name "Windows NT 4".

Application Server—All application sets (Agent/TC and Market Development Manager desktops, database administration and system administration) are run on this server. Database update routines are also run on this server. This server in the present embodiment is also an Intel-made CPU running Microsoft, Inc. software known by the trade name "Windows NT 4". The Application Server also runs a local Web server (such as Microsoft, Inc., "MS Internet Information Server 4").

Secure Socket Layer Server—A server that provides specialized encryption of parts of applications that require more secure transmission of information.

Web Server—The system's main web presence is hosted on a system powered by dual Intel-made CPU's running Microsoft, Inc. software known as "Windows NT" and "MS IIS" software.

Database Server—The database is housed on a system running dual Intel-made CPU's which uses Microsoft, Inc. "Windows NT" software. The database is implemented and managed with SQLServer 7 software.

Desktop—A Desktop is a set of applications programs made available to a particular user by the system, typically from the Application Server. In the present embodiment, there are 3 primary Desktops, the Agent Desktop, the Transaction Coordinator Desktop and the Market Development Manager Desktop. The Desktop may be accessed from any Internet connected computer by a selected login procedure which identifies the user.

Domain Name Server—A domain name service is typically provided by a local server. It also provides network monitoring and site monitoring services B. Overview of the System and its Components One embodiment of the system is adapted to operate in more than one market at the same time. Because this embodiment is designed to be used in more than one market at the same time, the database architecture is designed to integrate a diverse set of database data sources, including MLS databases from a plurality of different markets, into one listings data model. As will be further explained, the system has the capacity to accept data from sources other than from MLS databases. The entire business architecture of the system is supported through administration applications that allow the creation of roles and privileges for various types of system users. These roles and privileges are defined and stored in the database, and each application set uses the access rights defined in the database to set the particular environment (application sets).

The database provides a system of domains that deal with the data, the users, and the administration of the system. There are market-specific aspects of the system that can become part of the application environment when the application interface (web page) is generated. This overall model for the system depends upon integration of source-specific listing data and specific storage of any market-related differences for generation at run time. In this model, heavy use of dictionary information (data about the data) is stored within the database. It provides the ability to regenerate a source specific data set in its original form as a verification of the source data.

A substantial portion of the data in the system database typically consists of MLS database listing information. These data are characterized by a large volume of read access and a 'once a day' type of insert, update and delete session. The database is 'freshened' with new images of all the data sources. This is accomplished by an image comparison set of update routines and rules. The updates can be run at any time, but typically only need to be run once a day. Very active markets, for example, use four hour updates. Less active markets may require less frequent database updating. The update frequency is therefore not intended to be a limitation on the invention.

The general application architecture in this embodiment is a standard, three-tiered client/server model, the thin client provided by any user's browser, the web/application server and a database server. The client/server model used in this embodiment of the system is supported by both publicly available software, and custom software. For each application, the user interface is dynamically generated based upon style sheets and user responses.

Market-specific information, images and text are isolated and dynamically presented within the application. This is performed by associating a particular market with each user account, and setting a session variable when the user logs on to the system. In this manner, forms and information which are specific to each market can be presented in the correct context and format. As an example, real estate sale contracts used by many brokers in a particular market may be on a "standard" form such as provided by a local board of realtors. Such localized forms can be generated as needed for particular users based on data entered by the user at the time the account is set up.

Each application set (public web, Agent desktop, Transaction Coordinator desktop, Market Manager desktop, Service Provider Exchange, etc.) is a set of web pages dynamically generated by the web server. The resources required to generate the pages, subsequent system events and requests are supplied, in the present embodiment, by the database server and other application servers (for example the e-mail server, telephony server, etc.).

Application sets (web page groups) are defined by the particular user's role and requirements. All employees of the brokerage organization, for example, access a private, password-protected environment. Each brokerage employee in this embodiment also is assigned a specific role (such as Transaction Coordinator, Agent, Market Development Manager, etc., each of which will be further explained). Public users and customers of the brokerage do not enter this part of the site (logical segment) until after they have registered as customers of the brokerage, as previously explained. The registration process provides the password and account creation activities that identify each registered user.

A substantial portion of the brokerage web site can be made available to the general public, and would not require password entry. The demarcation point for password-protected access to the website is tied to the actual viewing of MLS database information. In this embodiment, general searches can be conducted by public access (unregistered) users, but MLS database information will not be shown to anyone other than to a registered user. Many of the features of registered user system access are centered around the property browsing process, alerting the user of changes in his/her area of interest, and passively guiding the user through the viewing process.

The applications are sets of pages (grouped or linked) that deal with the focus of the user. The pages themselves can be constructed using standard HTML with VB Script, Java Script and images, for all public and registered user applications. Specifically targeted at Version 4.0 compliant browsers, no application set or page can contain a requirement for the loading of a Java applet or ActiveX control. In this embodiment, for the customer to view virtual images of the properties listed in the database, the customer machine should have a PDF file viewer. A small Java applet will be loaded on to the customer (public user) machine from the web site when viewing virtual images of listed properties.

In this embodiment, subsequent, server side Java scripts exist and all gateway access is accomplished through MS ASP (application server pages) interface. All database access is handled through this interface with standard SQL queries and native record set manipulations. This includes nearly all of the database administration and updating functions.

Much of the web page design can be reused throughout the application sets (home clips, home details). Market specific information can be maintained through the use of included files for each page, and the page content dependents upon a session market variable and session user role. This architecture is easily scaled for new markets, so that a single set of system hardware can be applied to operate within a plurality of different markets without the need to have a physical presence in the particular market.

In this embodiment, each web page, whether public or customer access, is "security aware" in that the page checks for the presence of a 'userid' established as a session variable. This enables the recognition of past users through cookie storage, facilitates an internal session timeout and disables 'bookmark' access to private portions of the site. If a session is not active, or there is no 'userid' (session variable stored in the database among the accounts), then the page will enter an error handler that redirects the user to an appropriate page with activity messaging. Each session represents a connection to the database from the same 'system user'. Each is validated through the stored account information established at registration time.

An overview of one embodiment of the system according to the invention is shown in FIG. 1. In this embodiment, the database server 111, the web server 109, the application server 110 can be physically located in the same facility as the TC's. The TC's may serve separate markets, but may be in a location other than in the market served by that TC. Each TC, therefore may work at a respective terminal 102, 103, 104 connected to a local area network (LAN) 105 for the system. A market development manager 101 may also have a terminal located in the same facility as the TC's. The LAN 105 is connected in this embodiment to the servers 109, 110, 111 through a hub 106, and ultimately through a router 107 and firewall 108 to the Internet I. Mass storage of data can be performed on a disk array 112 or similar mass storage. Equipment connected to the system LAN 105, and importantly the servers 109, 110, 111, are preferably coupled to an uninterruptible power supply (UPS) 113 so that the system can continue to operate in the event of power failure at the system hardware location.

Buyers may log on to the system though respective Internet connected terminals, such as 116, 118. Similarly, Sellers may log on to the system through respective Internet connected terminals 115, 117. The application server 110 presents market specific pages to the logging on Sellers and Buyers, depending on the market in which each of the Sellers and Buyers wishes to become a customer of the broker operating the system. Each market served by the system includes local Agents who log on to the system through respective Agent Internet connected terminals, such as 119, 122. Some markets may be better served by having TC's present in the market. The system provides for such local TC's by enabling log on to a TC desktop at a TC respective Internet connected terminal such as 120, although having a TC physically located in the market is not a requirement for the system of the invention. Service providers who have electronic data communication facilities may also log on to the system through respective Internet connected terminals, such as 121 and 123. In every case, the system is adapted to provide market-specific pages to each user logging on to the system for operation within a particular market.

C. Data Assimilation

Listing information is a key component to the broker's service offering. "Listing Information" is a term of art in the real estate brokerage industry and includes, among other elements, data concerning each property which a broker offers for sale by a Seller such as size of a dwelling structure on the property, the seller's asking price for the property, types of amenities and numbers of and sizes of rooms in the dwelling structure. All brokers supply prospective buyers with available "active" listing information, in one form or another. In this embodiment of the invention, providing active listing information is performed through the Buyer registration process. The Buyer registration process establishes a Buyer account, and then in this embodiment allows the Buyer to browse through the active property listings on his own. In order to facilitate this process, the broker should provide a mechanism of access to the system database for each market. In this embodiment, MLS database listings are downloaded from the MLS system (the "data source") in each particular market served by the system, and the data are transferred into a common listing database. In this case, a commercially available relational database management system is used to implement the entire data model. This embodiment uses Microsoft, Inc.'s "SQLServer Version 7" as the relational database. It should be clearly understood that the data source and database management system are a matter of convenience for the system designer and are not intended to limit the invention.

In this embodiment of the invention, the broker (also the system operator) is presumed to be a licensed user of the local MLS database in any market in which the system operates, so the broker/operator is thus authorized to access and reproduce the information contained in each local MLS database according to the terms of the license therefor. Other data sources, however, may also be used, for example, browsing newspaper advertisements and contacting the advertiser or his representative to obtain additional information for the system database, which may be manually entered from a desktop or other database access to the system. Additional sources for information on properties to be listed as being offered for sale include public real estate ownership records, typically located at a county courthouse or municipal record keeping center.

In this embodiment, all application sets access the same data model regardless of the market being served. Each market's MLS database data source is mapped into the common data model once. The mapping information is then stored in a set of market-specific data source translation tables. The market specific data source translation tables are used in database updating procedures. The translation tables are used to convert local market data elements into a common model data element. In some cases this is a data type translation (i.e. numeric to text), in other cases text or numeric substations are made based upon definition translations (i.e. word substitution for home status—'For Sale' for 'Active'). These procedures can freshen the database for any particular market at any time.

Market "dictionaries" are constructed when the data source is initially mapped and are then used to decode information coming in from the data source. The decoded information is stored in the common data model and is used in user interfaces where a finite list of choices is desired. These dictionaries are also used to present local market context-correct choices to users, for example, the previously described local residential real estate sales contract forms.

For each market data source, which in the present embodiment includes the MLS database in each market, real property listing data in the system database at a selected time interval (the "update period") goes through an image comparison of the existing data set to determine whether there are any new property listings, to determine whether any listing information has changed, and to remove any listing information on any property that is no longer available for sale. The method of updating in this embodiment takes each source listing record and compares it to the existing market data set. If the listing is present, the update date field is compared. If the update field is the same, the next record is compared. If the update field is not the same, then the existing listing is deleted and the source listing is inserted. If the listing is not found in the existing market data set, the listing data are inserted. The reverse comparison, existing vs. data source is then completed, producing a summary of listing data that have been removed from the active market database. These listings also have their status updated.

In this embodiment, property listings are not removed from the database when they are no longer active. They become part of a market analysis data set that is used to help determine market trends and fair market values for properties within the particular market. These inactive property listings are preferably identified by their status as inactive.

D. Customer Registration

Any member of the public, in this embodiment, can register as a customer of the broker (either as a Buyer or Seller) through the broker's Internet-accessible web site. Hereinafter, such registering customers will be referred, for convenience, to as "users" where their interaction with the system is not defined in terms of the user's role in the transaction specifically as a Buyer or Seller. Each user chooses a (typically geographic) market of interest when entering the "public" Internet site. This permits the user to open an account in that market with the broker who operates the system. In this embodiment, a single user of the Internet-accessible site may open more than one user account, so as, for example, to be able to search and use listing data (or to list real property for sale) in more than one market. Through the system, broker/operator has the ability to display and use data from any selected markets they wish to expose to the public, and ultimately, to conduct real estate sales transactions in.

In the present embodiment, a prospective customer of the broker may have limited access, on the publicly accessible web site, to information resident in the system database on listed properties, in order for the prospective customer to decide whether he wishes to register as a customer (user) of the broker. Such limited access may include, for example, presentation of listing search results to the prospective user in a summary format that does not violate terms of use of the local MLS database information, or violate any local regulations on the business of real estate brokers An example of such a summary format may include a total number of properties listed as offered for sale and an average price for such listings within a selected geographic area. In this embodiment, the prospective user registers as a user to obtain complete listing information. Obtaining more complete information on any of the properties in this embodiment generally requires registration by the user as a customer of the broker.

In order to register as a customer of the broker, Buyers, for example, must review market-specific "broker information" (a disclosure of certain terms and conditions required by many states and municipalities) which is posted on a registration web page. The buyer must indicate on the registration web page (my mouse clicking on an appropriate button or box) that the prospective user has read and understood the broker information. An example of such a page is shown in FIG. 2. In the present embodiment, the database will have market-specific broker information resident in the system database, and the system will present to each prospective user the broker information required to be presented for the particular market in which the user wishes to register.

The prospective customer of the broker will be presented on the registration web page, a market-specific 'Terms of Use' statement. This statement outlines the conditions under which a Buyer may become a customer of the broker. The prospective Buyer checks (by selection in the appropriate position on the web page) that he/she has read and understood the Terms of Use statement. In one embodiment, at the same time as indicating that the prospective Buyer has read and understood the Terms of Use statement, the prospective Buyer also picks a time duration that a "customer agreement" will remain in place. The customer agreement arises when the prospective user indicates that he/she has read, understood and accepts the Terms of Use. Registering and selecting the time duration also sets the account time limit. An example of such a Terms of Use statement page is shown in FIG. 3.

The third step in registration is gathering selected personal information from the prospective Buyer. The prospective Buyer preferably enters information with which the account is associated. The minimum required fields in this embodiment are an e-mail address, a first name, a last name and an account password. An optional market survey may also be presented to the user. In the survey the prospective Buyer may optionally indicate the method of communication that got the prospective Buyer to the broker's publicly accessible web site. An example of a personal information entry page is shown in FIG. 4.

When the personal information is entered, in the present embodiment the prospective Buyer information is checked against a set of rules. These rules verify that all required fields are entered, that the correct text formation of the e-mail address is present, and that all required acknowledgements are in place. If the rules are not satisfied, the prospective Buyer is presented an error message on the web page and is instructed to correct the error. When the proper information is verified, an account is created, and a verification e-mail message is sent to the e-mail address previously entered by the Buyer.

Prospective Sellers can register as customers of the broker by filling out a short registration form on the broker's web site that requires a minimum number of information fields to be submitted. In general, these are the prospective Seller's name, address, city, state, zip code, phone number, e-mail address, and preferably data such an estimated square footage of a residence on a real property to be sold and an estimated sale price for that home. Information verification is conducted and errors are reported to the prospective Seller for correction. Submitting this information causes the system to generate an e-mail message to the prospective Seller, and generates a Seller registration event in the system. The Seller registration event generates an e-mail message to be sent to the market TC, and places the new registration in a "Seller registration event list" for that TC. When the TC handles the Seller registration event, the TC verifies the prospective Seller's information through a direct contact (which may be by e-mail or telephone, for example) and assigns an Agent to generate a listing appointment. The Agent is notified on a system-generated calendar of a showing event with listing information concerning the home being offered for sale.

Another method of user registration provides that the system generates a temporary account password that is then e-mailed to the e-mail address supplied by the prospective user. The user (Buyer or Seller) is then instructed to use this to log on to the system from the publicly accessible web site for the first time. The user is then afforded the capability of changing the password as desired for subsequent logins.

Once a Buyer or Seller account is established, access to the private side of the web site (which includes detailed information on listed properties) can be gained through the public web site by logging in using the account identification and password established at registration. If the user attempts to log in to the account after account expiration, the user is presented with the opportunity to extend the customer agreement with the broker's organization, and to keep the account and all information in the account. If the user does not extend the agreement, the system treats the account as "inactive". Inactive accounts are no longer accessible by their respective users. Such users may choose to register again at any time.

E. Property Searching

Figure 5:
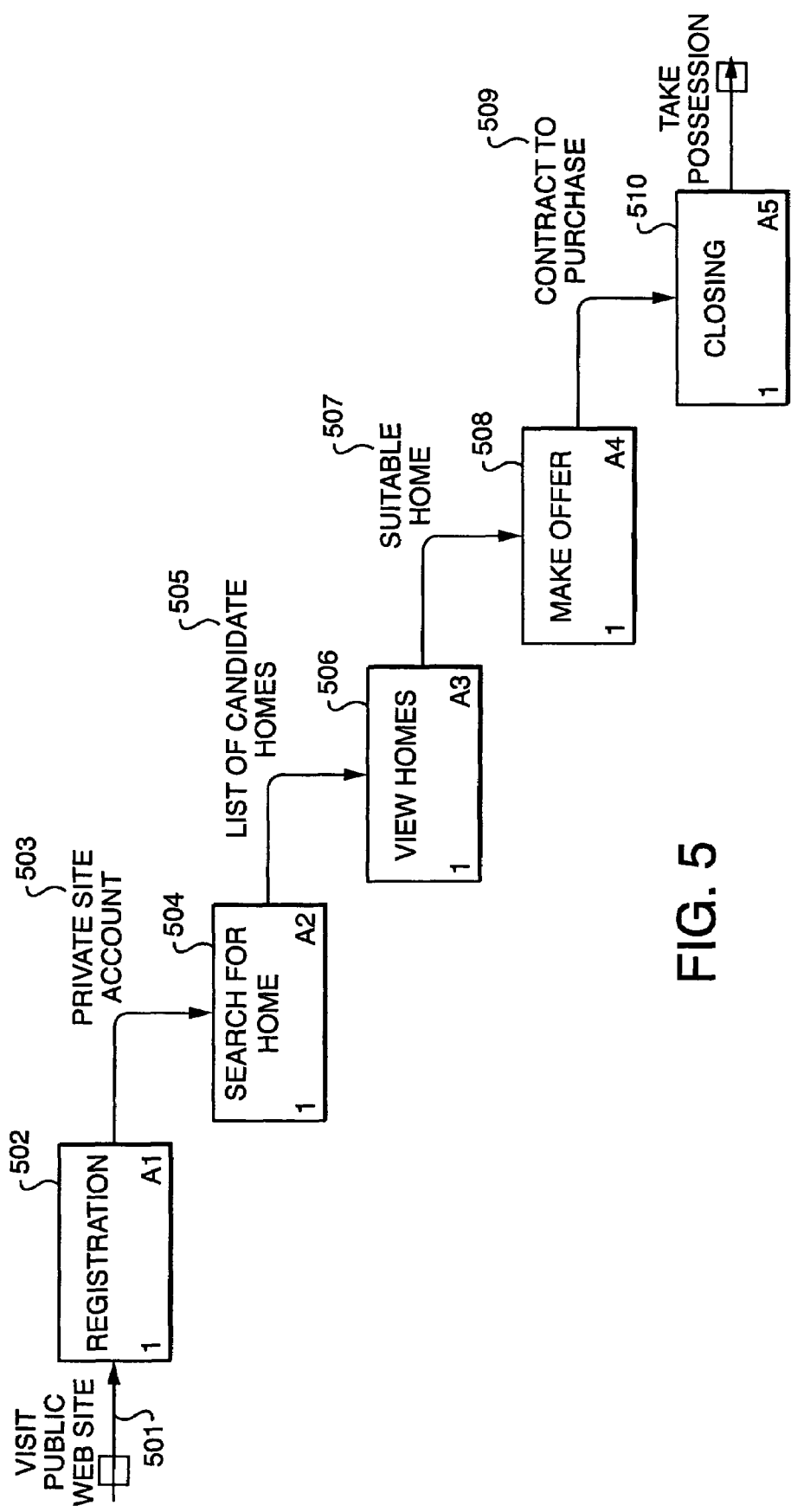
FIG. 5 shows a flow chart of one embodiment of a Buyer using the system to search for, select and purchase a home using the system of the invention.

Once logged in, a user (typically a Buyer) can conduct searches for properties. An example of how the system is used to search for, select, and purchase a property using the system of the invention is shown in the flow chart of FIG. 5. First, the prospective Buyer views the public website, at 501, and may register as a Buyer, at 502. The Buyer may then access the private side of the system web site, at 503, and enter search criteria at 504. A list of properties matching the search criteria is presented, at 505. Links to more detailed information in the database, including posted photographs, on each property on this list can be presented. For selected ones of the properties on the list a request to view can be entered by the Buyer, at 506. A buyer, after viewing (although viewing is not a requirement in the system of the invention), may offer to purchase a suitable property 507, by generating an offer on the system at 508. If the offer is ultimately accepted a contract is formed at 509, and the transfer of the property from buyer to seller is consummated at 510 (closing). Each of these actions in a home search and purchase procedure will be further explained.

There are several methods for conducting a property search in this embodiment of the invention. In general, a property search consists of two parts. First, the user chooses a selected geographic area within the market for searching. Second, the user defines particular parameters for homes that are desirable to the particular user. Parameters for each search conducted are preferably stored in the particular user's account information so that the user has a record of the searches conducted.

The geographic area of the search can be further subdivided into two categories, a specific definition and a geographic definition. The specific definition requires the user to choose a specific search type. Specific search types in this embodiment can include searching by specific property identification number (for example, MLS database listing number), an address designation, a street designation, a subdivision name or the name of a nearby school or selected school district. For each of the specific search types, the user provides the definition and the search is conducted based upon that information as follows:

1) MLS database listing number—The user provides a single MLS database listing number and the system database is searched using that number. Only two results are possible, either that no property matches the MLS database listing number, or one property matches the MLS database listing number. The result is displayed to the user.

2) Address—The user provides a street name and street number for a selected property listing and the system property database is searched using the address provided. Only two results are possible, no property has the address provided, or one property has the address provided. The search result is displayed to the user.

3) Street—The user provides the name of street. The database is searched and all the properties in the database that are on that street are displayed for the user. With the street designation two implementations are preferred. In one implementation, the street name is used in the database search as a 'like' designator. For example if a user supplied the street name of 'Maple', any property that existed on 'Maple St.', 'Maple Dr.', 'Maple Blvd' etc, would be returned in the search results. Similarly, properties located on 'Maple Park St', 'Maple Ridge Dr.' and 'Maple Valley Rd.', for example, would be returned in the search results using "Maple" as a street search parameter. A second implementation provides more narrow search results based on more narrow input search parameters. If the user supplies a more specific designation, for example, 'Maple Valley Rd.', then only those properties with that specific street designation would be returned in the search results.

4) Subdivision—The user provides the name of the subdivision and in the search results all properties are returned which are located within that subdivision. The subdivision search in this embodiment works in substantially the same way as the street name search. Multiple subdivisions may be searched depending upon the length and specificity of the subdivision name provided by the user. If, for example, the user provides the subdivision name of 'Briar', then all properties in the database located in such subdivisions in the data base as, 'Briar', Briar Park', 'Briar Grove', 'Briar Woods' and others subdivision beginning with 'Briar' would be returned in the search results. More specific subdivision names input by the user will return results from a similarly narrowed group of subdivision names.

5) School Name—In one implementation, the user provides as a search parameter a school name. All properties in the database which are located within the territory (usually designated by school authorities and provided as part of the MLS-database information) of the specifically named school are returned in the search results. In some cases the school name can be ambiguous within the particular market. It is possible, for example, to have an elementary school and a high school having at least partially overlapping geographic territories named 'Abe Lincoln'. As another example two 'Abe Lincoln' elementary schools could be located in two different, non-overlapping school districts in a particular market. In this embodiment, the ambiguity is resolved by presenting the user with the names of all schools having the selected name. The user then selects which one of the school names is actually the intended one. The selection is then used to narrow the search so as to return in the results all the properties located in the territory of the selected school.

6) Area—The area search is conducted by presenting the user with a choice of geographic territories in the market which are identifiable by any one of a number of designations. In one embodiment, the designation is the a postal "zip" code. In another embodiment, the designation is a school district. In another embodiment, the designation is the geographic boundary of a political subdivision such as a town or village within the market. By choosing the type of designation, and then choosing from a list of valid designations (these being generally stored on the database) within any particular type, the user can supply several areas in which to search for properties. For example, each market typically will have a plurality of valid zip code designations that are unique to that market. The user, on selecting "zip code" as the type of designation, is then presented with a list of those valid zip codes in the particular market and can select any one or more of the valid zip codes to be used as the area in which to search. Any properties within the selected zip codes are returned in the search results. Similarly, school district names or municipality (political subdivision) names which are in each market can be selected by the user. In the present embodiment, only one type of area designation can be selected for each individual search. To search additional areas in the present embodiment generally requires starting a new search. However, it should be clearly understood that this aspect of the area search implementation in this embodiment is a matter of convenience for the designer and is not intended to limit the invention.

7) Features in the Homes The features of in a prospective home (property) that are desired by the user are selected from a list of features presented to the user, which in this embodiment is called the 'Home Criteria'. Typically, in each market, a set of property types exist that are presented to and selected from by the user. Each set of features in this embodiment is related the property type. For example, the 'single family' property type contains bedrooms, bathrooms, kitchens. etc. as would be typical for a single family residence As another example, the 'lot' property type, for undeveloped property, would not even have a structure on it, so features related to improved residential properties, such as bedrooms, for example are not applicable for this property type. A common feature to all property type is the listing price provided by the Seller. In each particular market, a matrix of property types, common features and additional features is stored in the database. Once a user defines the property type, in this embodiment the property type is displayed to the user with a set of common features and a set of additional features. Each feature has a set of possible choices. For example, the number of bedrooms can be one, two, three, four, five, and five or more. The user is presented with a list of feature candidates and selects one or none of the choices. These selected features are then stored and used in combination with the area designation in a search of the database. In this embodiment, the user can alter the previously selected Home Criteria at any point in the search process, and can even refine the search results based upon the features selected after initial search results are returned. Initial search results may be obtained, for example, by using one of the previously described search criteria. The current embodiment provides the user with a single feature set for each property type that can be combined with any area designation. The Home Criteria parameter is saved for each user, for each market until and unless the user amends it. The system stores a record of each search conducted by market, user, area search type, area designation, and Home Criteria.

Search results, in this embodiment, are presented to the user in a list of properties matching the selected criteria. The list may include a picture, the list price and a features summary for each property in the displayed search results. The present embodiment provides five properties per web page, with page navigation for multiple page results. For each property in the list of properties in the displayed search results, in this embodiment a link is provided to more detailed information on each property. Detailed information web page(s) can be generated from information on the selected properties stored in the database.

Additional features about the properties may provided to the user from the detailed property description. In this embodiment, it is assumed that the user is interested in examining more detailed information about a particular property if the user elects to display the detailed page(s) on that property. Several other links are provided for from the detailed page(s) in this embodiment. A link to provide a map showing the geographic location of the property location is presented. The user is provided the ability to e-mail the property details and some accompanying comments to any selected e-mail address. In this embodiment, each detailed page of a property can include a link to view multiple photos of the property where such photographs are available in the database.

The user can place any selected property in a persistent store called a 'Portfolio'. The Portfolio can be viewed at any time during a user session. Information placed in the Portfolio by a user remains in the Portfolio even after the end of a user session. The Portfolio can be maintained by the user, when the user adds selected properties to it, or deletes selected properties from it. All the information in the database on each property selected to be added thereto is available to the user through the Portfolio. A particular feature of the Portfolio is the 'Portfolio Alert'. This is a selectable feature of the Portfolio and can be turned on or turned off at any time by the user. If a user turns on the Portfolio Alert, any change in the status (including, for example price, whether an offer to purchase has been made, or whether a contract to purchase has been created) of any property stored in the user's Portfolio will cause the system to automatically generate, in this embodiment, an e-mail message to that user to alert the user of this change. This Alert is generated by the previously described database update event in each market. During the update, any property that contains information changes is checked against each user's Portfolio. An e-mail message is generated and sent to any user who has the Portfolio Alert turned on, and a property in that user's Portfolio has changed price or status. The e-mail message contains notification of the property affected and the actual change in status or price. A record of the e-mail is also stored in the system database so that a notification history can be constructed for each user. Other embodiments of the invention include presenting a Portfolio Alert notice (which may be a separate page) in the user's account which can be viewed when the user logs into the system, and the system dialing a pager telephone number provided by the user to the system. In the pager notification embodiment, the system can generate an alphanumeric message, or can transmit a system-related identification number or code to inform the user to communicate with the system. Such communication will typically be in the form of login, but may include placing a telephone call to an Agent or TC assigned to the particular user at the time the user account is created.

In this embodiment, a second type of alert is made available to users which is known as the 'New Listing Alert'. This alert can also be turned on and off by each user. The New Listing Alert uses the Home Criteria and the area designation previously selected by a user to alert the user by e-mail when a property meeting the selected criteria is entered into the MLS database. The property must match both the user's Home Criteria and the user's area designation for the system to generate the e-mail alert. This alert is also generated as part of the database update. Any new listing is checked against the appropriate users' Home Criteria and area designations, for users who have their New Listing Alert turned on. The e-mail message contains information about the new property with an embedded link inviting the recipient user to add the new listing to his Portfolio.

Figure 6:
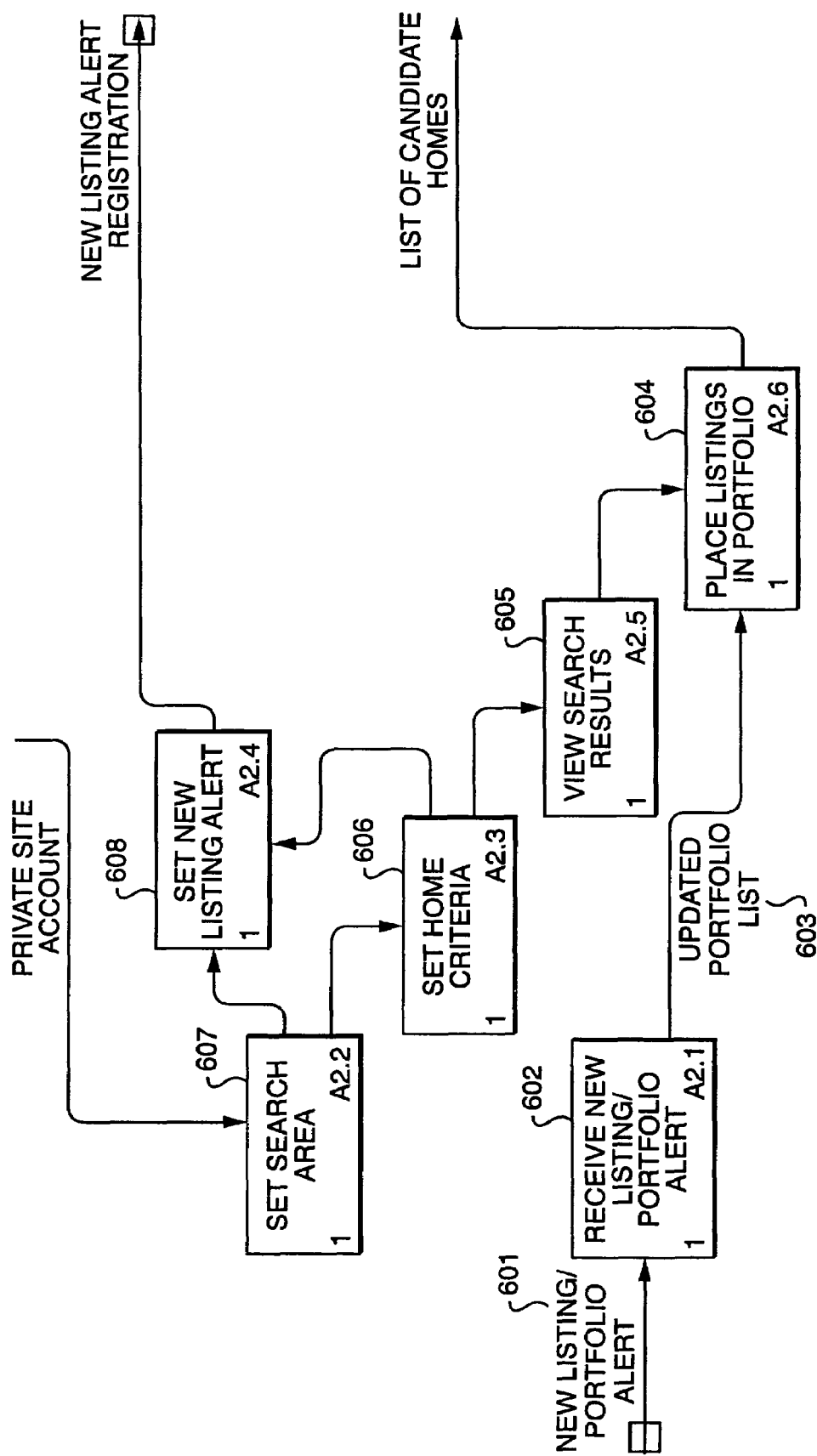
FIG. 6 shows a flow chart of one example of a Buyer's interaction with the system of the invention.

Referring to FIG. 6, some of the previously described search and Alert features are shown in the flowchart therein. Upon login, the Buyer may select search area 607 and search criteria 606. The New Listing Alert may be turned on or off, at 608. Search results are presented at 605, whereupon the Buyer may elect to place any number of the returned properties in the Portfolio at 604. When the database is updated, and the Alerts are turned on, any new listing which matches the search criteria will generate the Alert, at 601. Receipt of the Alert is shown at 602, and can be accomplished by the methods previously described herein. The Portfolio may be updated by the Buyer, at 603, 604, or in some embodiments, the Portfolio may be updated automatically, at 604, by the system when so instructed by the Buyer.

F. Viewing Appointment Requests

When a user (Buyer) makes a property selection and adds this property to the Portfolio, in this embodiment, the selected property is allowed expanded functionality. For any number of properties in a user's Portfolio, a request to physically visit the property for viewing (viewing request) can be made by the user. In this embodiment, the user can select from among the properties in his Portfolio, and for each one so selected choose a preferred and an alternate viewing appointment time (and date). Once the properties and the appointment request times are selected by the user, a request is initiated. It should be understood that enabling the viewing appointment request after adding the property to the Portfolio is only one example of allocating Buyer functionality in the system. Other embodiments may enable making viewing requests without the addition of a selected property to a Portfolio or any other persistent store.

In this embodiment, a first viewing request made by each user is preceded by a requirement for the user to provide to the system more detailed personal information about that user than may be required to open the Buyer account. This information includes, for example, telephone numbers at which the user can be contacted, both during and after regular business hours, the user's home address, whether or not the user has need of and/or has made purchase financing arrangements with any lending institution, and when the user has immediate plans to actually purchase a home. In this embodiment, a viewing request will not be processed by the system until this additional personal user information is entered. The intention for so limiting entry of viewing requests is to reduce the burden on the broker/operator and his Agents in setting up and executing viewing appointments where a user probably has no serious current interest in home purchase. Other embodiments may limit processing of a first viewing appointment request until a request for different types of personal information is fulfilled by such users.

Once a viewing request is made, the system in this embodiment provides that the requesting Buyer can monitor the status of his viewing request. A schedule of requested appointments is displayed to the Buyer on a page under his account. A Buyer can review the properties requested to be viewed and see that the appointments have been confirmed, denied or scheduled for the alternate time.

In one embodiment, the system automatically compares the requested time for viewing with times entered by the owner of the property as being available for viewing, and available time on schedules of the various Agents assigned to the broker in the particular market. If the requested time is outside the scope of the owner-supplied viewing times and/or the available Agent schedule times, the request logic will then compare the alternate viewing request time to the owner-supplied available times and Agent schedule times. If the alternate time is also outside the scope of the requested time, the request will be denied and an indication of the denial will be transmitted to the requesting Buyer's account. Note that the owner of the selected property may or may not be a Seller as the term is used herein, therefore the available viewing times are described as being specified by the property owner (or his designated representative).

The request for a viewing appointment in the present embodiment creates and "appointment request event" in the active (on duty) TC event calendar. It also causes the system to generate an e-mail message which is transmitted to the active TC. The processing of viewing appointments can be performed, in this embodiment, through the TC desktop. The TC then can generate a response to the requesting Buyer and can assign the viewing appointment to an Agent. The assigned Agent receives notification of this assignment through a "showing appointment" event. The showing appointment event is placed on an Agent desktop-accessible calendar. Details of the TC and Agent roles and functionality within the system (respective Desktops) will be further explained. In the present embodiment, automatic scheduling of viewing appointments may be unavailable where the person offering the property for sale is not a Seller (i.e. using the broker as the listing entity) and therefore may not have provided available viewing times to the system.

Irrespective of how the viewing appointment is scheduled or confirmed (automatically or through the TC), when a viewing appointment is confirmed, instructions about which Agent has been assigned, the property on which the appointment is confirmed, and the order of viewing appointments (if more than one is made by the Buyer) are transmitted to the requesting user (Buyer), generally by e-mail message and by posting a message to the Buyer's account. Some embodiments of the system may include a pager interface to generate a pager (e.g. alphanumeric) message for transmission to the Buyer on confirmation of viewing appointments. The pager message can indicate to the Buyer that a logon is necessary to review new information in the Buyer's account (the confirmed viewing appointment).

For each property, in this embodiment the Buyer has the ability to enter and maintain notes (comments) in his account. These notes may contain anything the user desires to enter, but are generally intended to include reminders concerning a property once it has been viewed by the Buyer. These notes are stored for review within the Buyer account and are organized by the particular property viewed. Any time the Buyer views the Portfolio, the user entered notes on each property are available for review by the Buyer.

G. Making an Offer to Purchase

In the present embodiment, the user (in this case the Buyer) can make an offer to purchase a property at any time after a property has been added to the Portfolio. In this embodiment, actually viewing the property is not a prerequisite to making an offer to purchase. The offer can be made unassisted, or alternatively can be made through the Agent desktop on behalf of the user (Buyer). Other embodiments may provide that the Buyer can make an offer to purchase without adding a property to the Portfolio or any other persistent store.

From the Portfolio, in this embodiment, the Buyer selects the property on which an offer is to be placed. The Buyer then supplies identification information that is not already in the account at that time. Recall that only minimal information is required to open a user account in this embodiment. In order to generate an offer to purchase, in this embodiment the system will require the Buyer to enter personal information which can positively identify the Buyer, such as a tax identification number. The Buyer must also supply information which is typically required in a standard residential real estate purchase contract, including but not limited to: an offer price, the cash portion of the offer price to be paid by the Buyer, any amount to be financed by a third party lender, and the time period within which an application to obtain any such financing must be approved by a lending institution. Any other information concerning contingencies of the offer are also needed at this time, including an amount of earnest money and terms for such earnest money, possession date, closing date and any particulars about the conditions on possession of the property. Any free-form contingencies forming part of the offer are provided for during creation of the offer. In the case where the Buyer generates an offer unassisted, the offer data entered by the Buyer are compared by the system to a set of rules governing the requirements in the particular market for a valid offer to exist. Any deficiencies in the data supplied by the Buyer are returned to the Buyer in the data entry session. The Buyer must remedy the indicated deficiencies or no offer document will be generated. When all the deficiencies are corrected by the Buyer, ad valid offer exists, and the offer can be transmitted to the property seller by methods which will be further described below.

If the Buyer submits the offer unassisted, then a notification of this event is generated by the system and sent to the Agent assigned by the TC to this Buyer, and to the TC responsible for the Agent. The transmission is typically by posting the event to the TC and Agent desktops. The offer information, in this embodiment, is reviewed by the Agent, and the Buyer is contacted to determine any modifications to the offer that might be required. This notification of the offer to the Agent also includes a prompt to the Agent to enter a note with the offer to record any advice that may have been offered to the Buyer at that time by the Agent. When the offer is deemed ready, in this embodiment a PDF document including the entire text of the offer is generated, and can be reviewed by the Agent from the Agent desktop. This document may then be printed and transmitted to the listing agent (or broker) either by facsimile, transmitted as a facsimile file directly to a facsimile machine, or alternatively transmitted as an attachment to an e-mail message transmitted to the "listing agent" (the agent who is responsible for the particular listed property, who may or may not be an employee of the same broker who operates the system of the invention). The offer document may also be posted to a secure Web page which is accessible by the Seller of the property, the broker who has a listing agreement with the Seller, or any agent of the listing broker. Which form of communication is used to transmit the offer to the listing agent depends on whether that listing agent has provided such contact information to the MLS database and/or to the Buyer's broker.

If the offer is made with the assistance of a TC or Agent, then the offer can be transmitted immediately. Assisted offers are generated in one embodiment through the Agent Desktop, or alternatively through the TC Desktop. In this embodiment, users may make the offer directly, but each offer is preferably reviewed or otherwise made in conjunction with representation by a licensed real estate agent or broker.

Offer documents in this embodiment are tailored to meet the standard practice and any legal requirements of the market in which the transaction is to take place. The system in this embodiment performs this function by providing the Agent and TC a market-specific set of PDF based forms that can be filled in from the database information through a formatting interface. In the present embodiment, each market served by the system will have available a set of forms which are used by licensed real estate brokers and agents in each market. These forms are converted to PDF format, and the system selects the ones of the forms to use in any transaction based on the market in which the transaction takes place. This provides compliance with local regulations and laws, and assures consistency of documentation within any market. Depending upon the type of property in any transaction, and on market-related variations in the forms used, a set of forms for each contract situation is predefined, and data storage for each form element is mapped to the market, contract type and form set. As is understood by those skilled in the art of real estate transactions, the offer document is typically a market standard real estate purchase contract. The offer becomes a contract when accepted by the Seller, and the contract is memorialized on the same market-specific contract form as used to generate the offer document.

Any modifications to the offer as originally generated can be made by a TC or by an Agent. Because these modifications are not done on a hardcopy of the offer document, each modification in this embodiment is tracked by forcing the person changing the item to pick that user's name from a drop down menu and entering the user's account password. Any such modification to the offer is recorded in the database. The modifications can be made on behalf of the seller to reflect any counter-offer made by the seller. The modifications made herein do not substitute for the hardcopy modification, however they are reflected in the digital version of the document. These offer modifications can also be viewed by the Buyer. Further modifications can then be made by the Buyer or by the Buyer's assigned Agent or the TC. Changes are made to reflect as many counter-offers as required to either form the contract or conclude that no contract will be made between the seller and the Buyer Once an offer (or any counter-offer) is accepted, and a contract is thus formed, the system produces a final contract document which reflects the actual terms thereof. This document is reviewed by the TC and the Agent. The contract document in this embodiment can be communicated to the Buyer and to the seller for execution as a file attachment to an e-mail message, as a facsimile file directed to a facsimile machine, or on a secure web page accessible by the Buyer and the seller in respective accounts. The system may also print the document at a selected location, such as the Agent's office for physical transmission to the Buyer and the seller for execution.

H. Services Transaction Management

Services transaction management in the system of the invention is concerned with enabling a user to place orders for closing services, tracking the status of any such orders for services, and viewing the purchase transaction closing documents prior to the actual transaction closing appointment. Once an offer to purchase is accepted by the seller (or counter offer accepted by the Buyer), and in some cases during the offer process, certain closing service providers may need to be selected by both the Buyer and/or the seller. The type and number of closing services required depends on the type of property, what market the transaction will take place in, and whether or not financing is required by the Buyer. A service provider ("SP") is an entity engaged in the business of providing a service that is required to complete the property transfer. In the present embodiment, the types of SP include mortgage lenders (including mortgage originators), title insurance companies, inspection service providers, appraisers, home warranty and insurance providers, and moving companies.

During the offer process, any need for financing by the Buyer is discovered, along with the need for various inspections typically required by mortgage lenders. It is left to the Buyer choose the SP for each particular service needed and to make application for those services, and any appointments therefor. In this embodiment, the system includes names of a series of service providers specific to each market served, that are made available for selection by users (both the Buyer and the Seller). These SPs have registered with the system operator as offering particular types of services, and preferably provide information on pricing of their respective services. By registering with the system operator, an SP will have his entity name, and related services information, displayed on a list of SPs at the time the required services list is generated by the system. Each of these SPs is categorized in two ways, by the type of services offered, and by the type of communications capabilities each has. The types of communications capabilities include electronic data interchange, e-mail, facsimile, pager, telephone and mailing or shipping (physical) address.

For each SP listed in the system in each service category in each market, a communications profile is stored in the database. This profile includes both contact and method of contact information required to communicate with each SP. The communications profile also designates the preferred method of communication for each type of service that is provided by the SP. Each service type includes therefor an electronic application and/or electronic service order. When a SP has made arrangements to provide services through the system according to the invention, the information on that SP is entered into the system database through an interface that includes the communications profile information. Any SP can operate in a plurality markets, each with a local communications profile specific to that market. Such market-specific profiles may be required, for example, by laws affecting the provision of particular services in any jurisdiction, or may, for example, reflect the prevailing commercial practice in a particular market.

When a Buyer has completed the offer process, an electronic check-list of services required for the closing is presented to the Buyer through the account. This list is constructed dynamically based on a set of market, property type and finance rules stored in the database. This rules set is constructed for each market and is defined by the TCs responsible for the market. For example, a rule in a particular state may require homes of a certain age or above to be certified for the absence lead based paint. Another local rule, for example, may require that asbestos insulation be certified not to be present in a residence. Existence of such rules would dictate that the Buyer must arrange to provide for the respective inspections prior to closing the transaction. The system according to the invention would indicate the required inspections, and may in one embodiment provide web links to a list of SPs registered with the system operator in the particular market. Financing arrangements require different applications sets depending upon the amount financed and type of loan requested. The checklist of services is produced with the rules applied to the total list of services.

For each type of service in the checklist, in the present embodiment the user can view a list of SPs. For each SP, a profile of services and prices is made available for viewing by the user. The user can then select which SP he wishes to provide each service for the closing. After the selection of SP's, a dynamic set of interfaces is presented to the user that enables the user to fill out required information fields in order to make application for each service. In all cases, these interfaces are categorized by the service, but only present to the user data entry fields that are required by the application or service order where the information required is not already available from within the database. In this embodiment, information already provided to the system by the user is not presented for fill out in a data entry field. For example, if an information element such as the applicant's address is already in the database (such as from the registration of the user), it is not presented again during the service ordering process. In this manner, the required information fields for all applications and service orders are mapped and stored in the database. This reduces the total amount of information that the user is required to provide because duplicate data entry is eliminated.

When the ordering process is completed, a review or verification of the contents of the applications and orders is conducted by the system, either automatically, or in some embodiments, by displaying the order information on the Agent and/or TC desktop. If any information is incorrect or missing, editing is conducted by manipulating the same set of input interfaces that were used in the entry phase. When data entry for each service is complete, the orders are placed to the respective SPs.

Placing the order is done in accordance with each SP's communication profile. If the SP's profile, for example, requires faxing a copy to a selected telephone number, the system generates to fax. If a particular SP has e-mail communications facilities, the application may be attached as a file and sent to a provided e-mail address. Other profile scenarios may include the system generating an e-mail message to the TC. This message contains the profile information for the TC to place a phone call to the service provider (inspectors and appraisers). Electronic methods include bundling of service order forms and placing these orders on proprietary FTP sites for processing.

Once service orders are placed, the user is notified, via e-mail and/or posting to the user's account, that a status update is available for each one of the services. The user can then log into his account and access a services transaction interface to view the details of the status update. The status update details may vary with the type of service, but generally, the status on each service will indicate at least whether or not the particular service has been completed as of the status update viewing time.

Upon service completion, the service order, and subsequent documents such as invoices and reports are available for viewing by the user. When a particular SP is not capable of electronic information exchange, a hardcopy of any documents related to the service provided by such SPs can be scanned by the TC and made available to the user electronically by the system. When all services are complete, an electronic copy of the services orders and associated documents are available to the user for viewing through the account.

For SP's which have capability of full electronic data exchange, in one embodiment, documents generated by the order and provision of the service of that SP can be generated from templates already stored in the database. For example, a particular SP such as a mechanical inspector may have a standard report form to be delivered to the entity ordering such inspection on completion of the inspection. A form template, and invoice template may be stored in the database for this SP, so that on completion of the service, for example, the completed report and invoice can be transmitted electronically to the TC, Agent and/or ordering user. Such transmission can be by PDF file attachment or any other suitable document transmission form, for example, generating and sending a facsimile document file to a selected telephone line-connected facsimile machine. Alternatively, where the SP does not have fully electronic data exchange, reports and/or invoices can be transmitted to the system such as by facsimile to the TC and/or Agent for scanning and entry into the system.

Figure 9:
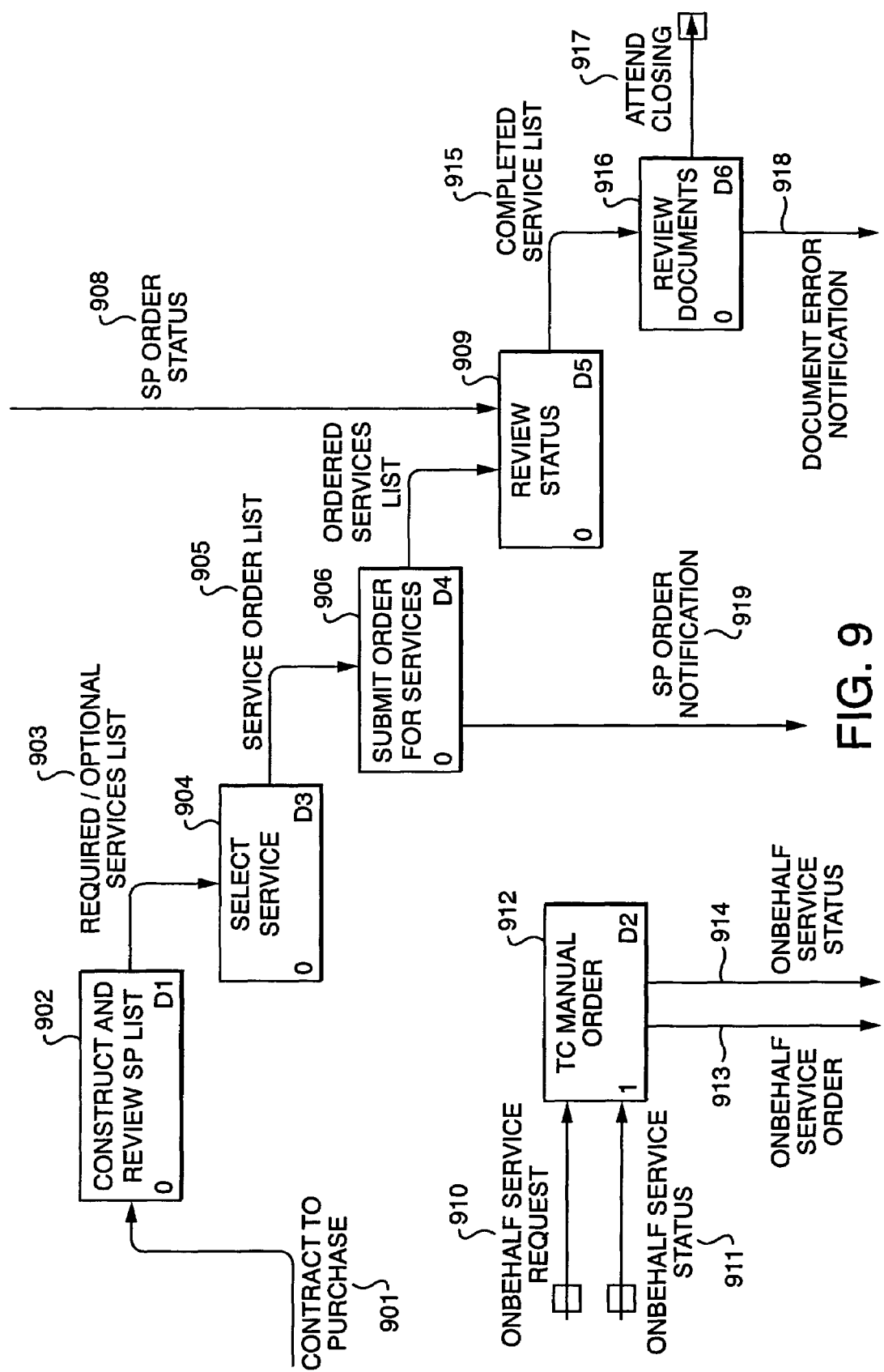
FIG. 9 shows a flow chart for one embodiment of processing orders for closing services in the system of the invention.

FIG. 9 shows a flow chart of one embodiment of the various SP interactions with the system of the invention. At 901, consummation of the contact to purchase causes the system to construct and present respective closing services lists, at 902, to the Buyer and Seller. The list will indicate, at 903, which of the services are optional and which are required, either by regulation or by a financial institution to lend money to purchase the property. Either or both Buyer and Seller may select services directly from the list, at 904, from among the SP's who have previously provided information to the system. The ordered services, at 905 are transferred to a list for viewing by the Agent and/or TC. Orders for services may be submitted, at 906, either directly, to SP's having electronic communication listed in the SP communications profile, or alternatively, may be placed manually by the TC, at 912, where such as request is made by the Agent, Buyer and/or Seller at 910. The SP is notified, either electronically at 909, or manually at 913 of the order. The status of the order, being at least whether the order has been completed, is reported to the system electronically (through the SP system logon interface) at 908, or manually by reporting to the TC, as shown at 914. In the case where the SP has electronic (Internet and/or e-mail) communications capability, order status can be reported to the system by the SP as shown at 908. The TC, Agent, Buyer and Seller can review the service order status from their respective terminals, as shown at 909. On completion of each ordered service, at 915, documents related to provision of the completed service, such as reports, invoices, etc. are generated and transferred to the system according to the communications capability of the SP. At 916, the completed documents are reviewed by the TC and/or Agent assigned to the transaction. Any errors are reported back to the SP who provided the service, at 918. Proper documents are made ready for closing, as shown at 917.

I. Listing Services

Figure 7:
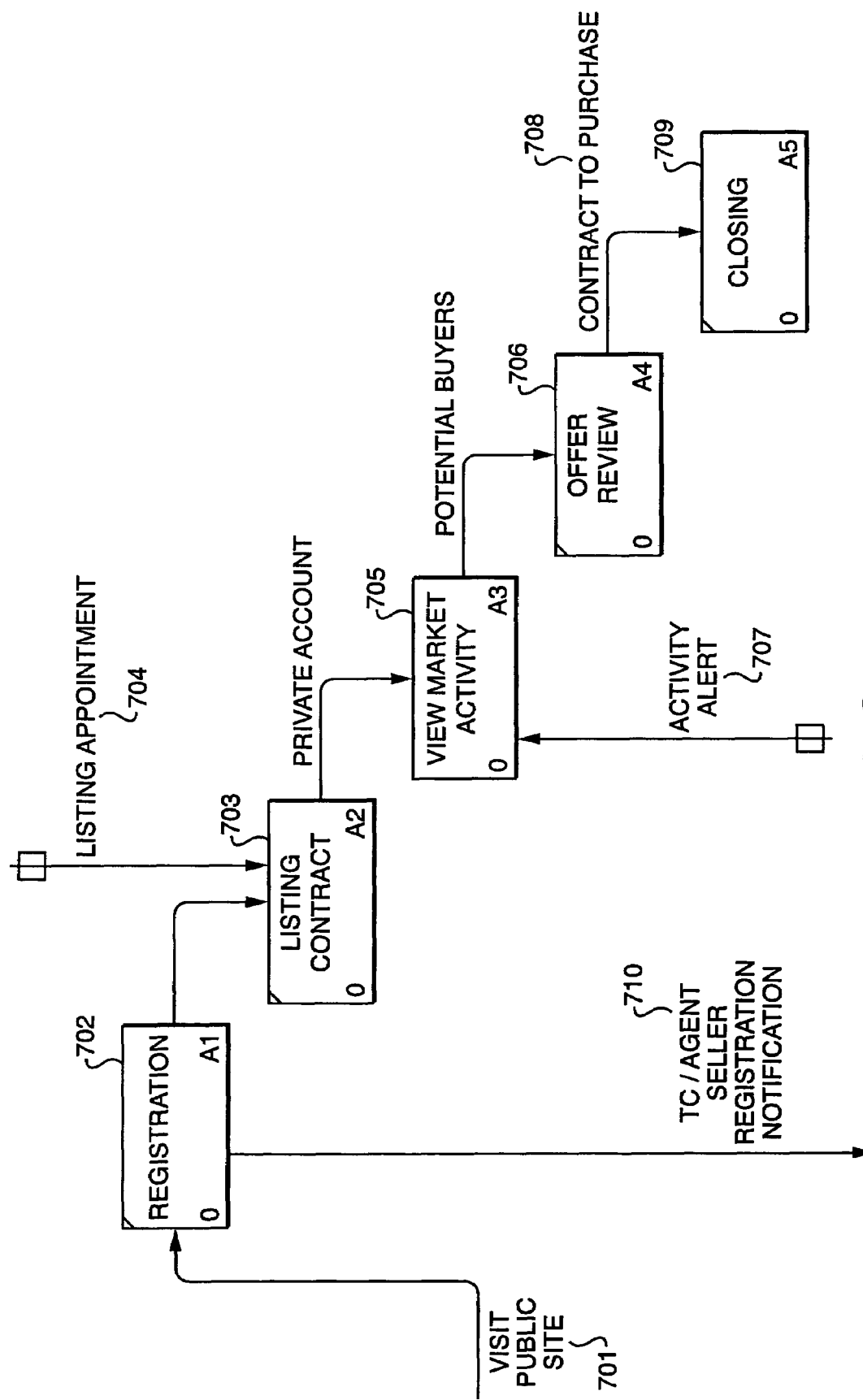
FIG. 7 shows a flow chart of one example of a Seller's interactions with the system of the invention.

1) Seller Utilities A Seller can interact with the system, after registration, by reviewing information about the property he has listed for sale. Registration in this embodiment is similar to the registration performed by the Buyer, with the exception that the Seller provides information concerning a property to be listed in the system as offered for sale. Through the account the Seller can turn on and off specific notifications made available through the system. These notifications are similar to the 'New Listing Alert' and 'Portfolio Alert' provided to the Buyer. These Seller-specific notifications are called 'Activity Alerts'. These Alerts can include generating an e-mail message that is sent to the Sellers e-mail address when a new listing that competes with the Seller's listed property is placed on the market. The notifications also can include notice (such as by e-mail message) of inventory reductions when any of such competing properties are sold. The Activity Alerts in this embodiment are restricted, as a matter of convenience, to homes of similar value, building configuration and location within the particular market. The Activity Alerts are tied to the database update process and are generated and transmitted to the Seller when the database update is completed. The particulars of each Activity Alert are also stored in the database so that the Seller has the ability to review them through the Seller's account. Sellers also have the ability to monitor the broker's web site activity with respect to the property listed. Several activity measurements are available to the Seller. These include the number of times a search has included the listed property, the number of times a Buyer account has viewed the details of the property, the number of Buyer accounts that have the listed property in the respective Portfolios and the number of viewing requests made for the property. Each of the viewing requests is accompanied by an appointment disposition that includes any Agent and/or viewer comments if such are entered by the viewing Buyer or Agent. The Activity Alerts can provide the Seller with a very useful set of marketing tools to assist him in consummating a sale of the listed property. For example, if competing properties described in an Activity Alert have asking prices significantly different from the asking price proposed by the Seller, the Seller may use these data to adjust the asking price of the listed property accordingly. Similarly, data on the number of viewing requests and number of Portfolios in which the listed property is included may induce the Seller to make adjustments in the asking price. Comments included in the database by prospective Buyers may be communicated to the Seller so that the Seller may take remedial action, based on such comments, to repair any deficiencies in the appearance or function of the listed property. In one embodiment, the comments may be transmitted to the Seller without any identification of the prospective Buyers making such comments. In this way, the Buyers may be encouraged to include comments in their account information without fear of identity disclosure, and the Seller can receive what may be more complete information about the public impression made by the listed property. These elements are shown in the flow chart in FIG. 7. A prospective Seller logs on to the system at the publicly accessible web site at 701. If the prospective Seller wishes to become a customer of the broker/operator and list a property, the prospective Seller registers therefor at 702. Notification of the registration event is transmitted through the system to the TC and/or Agent at 710. Creation of the listing contract is shown at 703 after which, at 704, an Agent is assigned to personally view the to be listed property. The Seller has the capacity, as explained and as shown at 705 to view the activity of Buyers as to the listed property. Activity Alerts, shown at 707, are transmitted to the Seller by the system. Offers to purchase are transmitted to the Seller at 706 for review, and if ultimately accepted, consummating a sales contract at 708. The contract is performed (property transferred) at the closing, shown in FIG. 7 at 709.

2) The "Agent Desktop" and Listing Management As part of automating the real estate transaction process, Agents have their own set of web-based applications known as the 'Agent Desktop'. These applications are served by the application server in this embodiment, and require their own security access. The applications consist of a set of enabling tools that allow an Agent to conduct Agent-related business completely within a single environment. The applications includes contact management for their assigned Buyers and Sellers, scheduling of events including meetings and event handling for real-time response to Buyer and/or Seller requests from the system web site. Because these are secure web based applications, an Agent can be in any physical location, in any market and still be able to work by using access to the system through an Internet service provider (ISP).

Although the Agent applications in this embodiment are served from a different server, the Agent applications share a common data store and therefore share data, events and status with the applications on other servers in the system. Because of the common data store, Agents can review and use the same information through a distinct set of applications that are tailored for their procedures.

In the present embodiment, each Agent has his own account that may be specific to the Agent's area of responsibility (such as a geographic area within a particular market). Scheduling of events or appointments is done through a calendar interface that allows the Agent to schedule, confirm and invite other participants to a variety of event and appointment types. In the present embodiment, these event and appointment types may include personal time, showings, closings, listing appointments and meetings. Although the Agent has the ability to schedule any of these events by data entry on the Agent Desktop, a TC responsible for the Agent's area may also schedule listing appointments, showings appointments, and closing appointments for the Agent.

An appointment that is scheduled by a TC shows up on the Agent's calendar, and must be confirmed from the event details. Shared calendar information enables the TC to avoid scheduling events too close together, or in conflict with any previously scheduled event. In the present embodiment, management control over scheduling events is maintained by the TC. This control takes the form of having events scheduled by a TC for an Agent as undeletable by the Agent from his calendar until the scheduled time particular event has passed.

For each showing appointment, details about the Buyer resident in the database are available to the Agent for review. These details include, for example, purchase contact information, information about properties in the Buyer's portfolio, a history of the properties the Buyer has already been shown, and information about any financing arrangements made by the Buyer, such as application for mortgage prequalification. For closing appointments, in another example, the status of all services required for the closing is available to the Agent for review. For listing appointments, where a Seller has registered as such on the system web site, and has requested an appointment to list a property, information about the property is made available to the Agent.

Specifically related to listings, in the present embodiment, the Agent has the ability to manage his own property listings. On the Agent Desktop these functions are partitioned into three categories, listing preparation, listing agreements, and listing closes. Listing preparation displays to the Agent a specific list of tasks required to prepare for a listing appointment with a prospective Seller. Specifically, by using the address of the potential listing the Agent can prepare overall market information, conduct a comparative market analysis, gather school information, taxation information and prepare a listing agreement.

Market information in this embodiment is presented in a PDF file format report that can be printed or viewed on the Agent Desktop. The report contains overall market information pertaining to the specific subdivision or area of the prospectively listed property. This information can include the number of homes sold over the past year, the average selling price of the homes sold, and the average number of days these homes were on the market prior to sale. Supplemental information about listing inventories in the area is also supplied in the report. This supplemental listing information includes the number of homes that are currently for sale in the area, the average selling price and the average number of days the properties have been on the market.

A "comparative market analysis" is an application that the Agent can use to help establish a selling price for the prospectively listed property. The analysis is based upon similar houses in a similar geographic location in the same market. This analysis is started, in the present embodiment, by the Agent entering the address of the property to be listed. If the property does not exist in the database in a history or properties sold, the Agent is prompted to enter addition identification items, including square footage of the dwelling structure (residence), the number of bedrooms, the number of bathrooms, the number of garage spaces, the total number of rooms and the overall physical condition of the structures on the property. If the information on the property is already in the database, the information on the property are displayed to the Agent for verification. With this verification, or with the details supplied by the Agent, "candidate" properties are searched for among the "sold histories" (list of properties actually sold within a preselected time period prior to the prospective listing) in the database. Candidates are then presented to the Agent for inclusion in the analysis. An Agent can reject any historical listing by not checking it for inclusion. Once a set of candidates is completed a report is produced that the Agent can adjust. The report provides the details of the candidate properties, and computes a suggested initial offer price. In one embodiment, the suggested initial offer price is based upon the average of the comparison candidate listings actual sale price per square foot of size of the structures on the sold properties.

School information is part of the preparation and is provided, in this embodiment, through the Agent desktop. Once an address is entered the names of the school district, public elementary, middle and high schools are determined from information in the database and are displayed to the Agent on the Agent Desktop. Reports are generated from the database that contain location information, accreditation and school performance data. These data can be acquired from publicly available sources, and subsequently entered by a selected individual into the database.

Taxation information is supplied, along with the MLS data, and a market-specific listing contract is presented for review by the Agent. These report elements are produced and placed in a PDF file format. The report elements can then be downloaded to the Agent's local computer. In this manner the Agent can operate remotely and service a listing appointment without being connected to the system over the Internet. The listing contract can be printed for execution by the Seller. The listing contract can be transmitted to the Seller for execution in a number of different ways in addition to local printing. One way is to send the PDF file to the Seller as an attachment to an e-mail message. Another way is to convert the PDF file to a facsimile message and send to a Seller-controlled or Seller-accessible facsimile machine.

Once a listing contract is executed by the Seller and Buyer, the executed contract is scanned and is then made available on the system to the Agent, the Seller and the TC for viewing. The listing information itself is entered through a listing initiation process. Depending on the particular market, this listing information is then uploaded to the market MLS database or is re-entered into the market MLS system manually by the TC. The listing information required by market MLS systems is typically extensive. There are several categories of data elements in the listing information. These include physical location, exterior descriptions, interior descriptions, over all room dimensions, amenities, utilities, showing instructions and any applicable sale terms. Most of these categories in the present embodiment include a "remarks" section in the data field for each category, into which the Agent can enter selected comments.

During the listing period (the time period of the listing contract) the Agent and TC have access to the same information previously outlined in the Listing Services section. The Agent and/or TC can monitor the same activities on the listed property as can the Seller. Further, the Agent Desktop provides an 'Open House Log' so that "open houses" (viewing sessions open to the public without any appointment) can be scheduled by the Agent and/or the TC. The results of open houses can be logged here as well, including, in this embodiment, information about the number of visitors, showing agents identification and comments made by showing agents about the listed property (noting that the showing "agents" may or may not be part of the operator/broker organization and thus may or may not be Agents as the term is used herein). This open house log allows the Agent to generate an e-mail message to be sent to the Seller including an Open House Report. The Open House Report in the present embodiment contains the information related to the results of any open house.

Also, during the listing period, a log of showing appointments and viewing feedback is available to the Agent on the Agent Desktop. The information which generates the log is entered by the listing Agent or the assigned TC. Feedback on market response can be made part of the information that is supplied to the Seller in the Listing Services section previously described.

If an offer to purchase is received on the listed property, the Agent can enter the offer parameters into the system on behalf of the buyer. This then begins the offer process as described in the previous section entitled "Making an Offer". If an offer is accepted by the Seller, closing information such as the date, location and contract particulars such as proceeds disposition and special conditions are entered into the system by the Agent or the TC at this time.

Each listed property can be tracked from creation of the sales contract to the closing transaction with specific emphasis on the listing services during the listing period. Once the property closes it can be removed from the database of actively listed properties. The listed property and all of its related information, in the present embodiment, are archived by changing the status of the property to "sold". The listed property data are then placed, in the present embodiment, on a removable media for long term storage. In the present embodiment this storage is a read-writeable compact disc.

Figure 8:
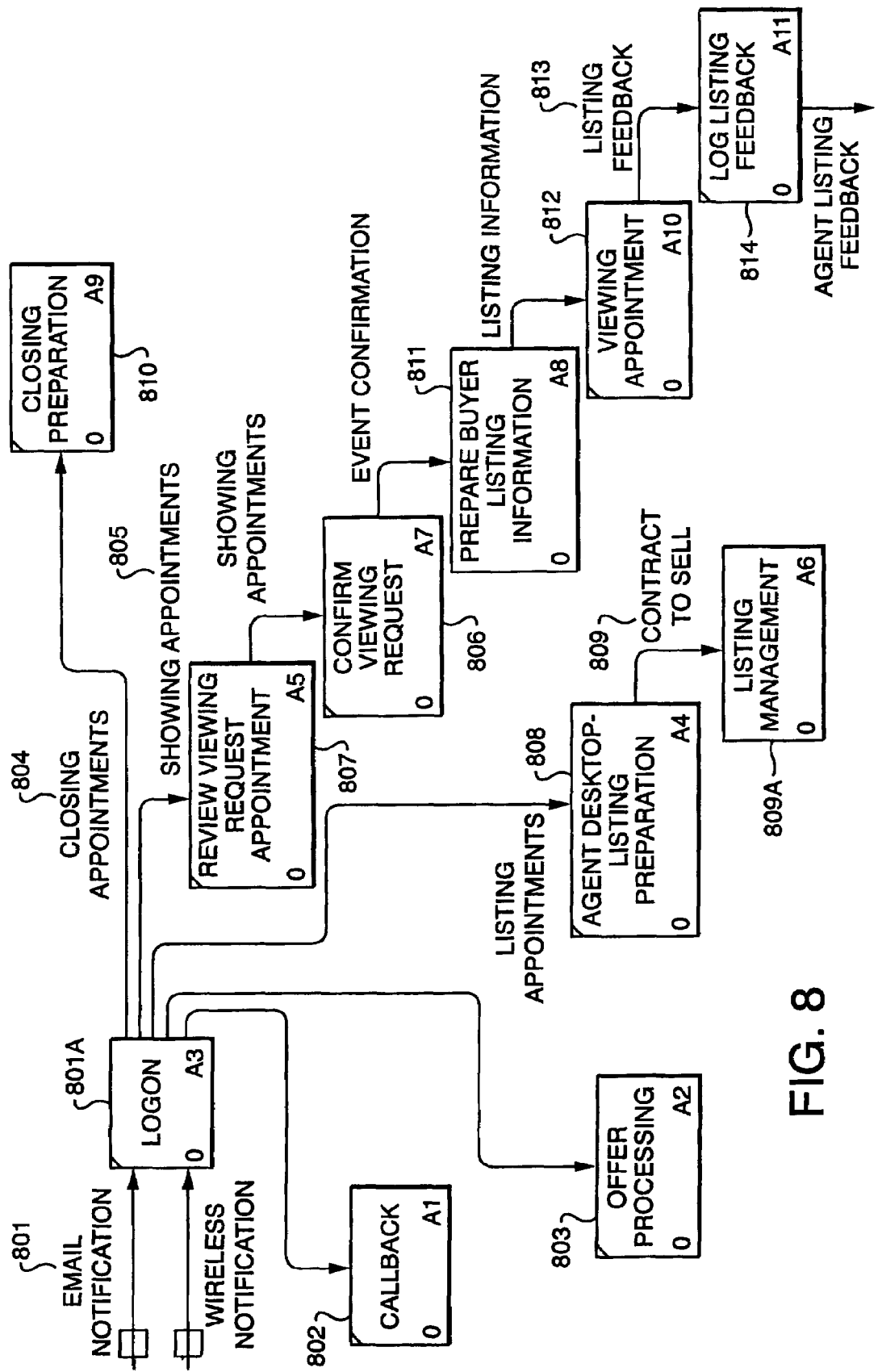
FIG. 8 shows a flow chart of one example of an Agent's interactions with the system of the invention.

The various interactions between the Agent and the present embodiment of the system are shown generally in a flow chart in FIG. 8. For any event which requires immediate action on the part of the Agent, such as a request to generate a new listing appointment or request to call back a Buyer or Seller, notification sent by the system (directly or initiated by the TC) is shown at 801. Such notification, as previously explained, can be in the form of e-mail sent to an Agent e-mail account, by wireless telephone message or by pager message. Agent login in response to the message, or at the start of a work period, is shown at 801A. Once logged in, the Agent reviews the Agent calendar from the Agent desktop. The calendar will include the previously described events such as closing appointments at 804, requests to call back a user at 802, requests for viewing appointments and showing appointments at 807 and 805, respectively. Confirmation of viewing appointments is shown at 806. Confirmation of, and processing of, listing appointments and new listing data is shown at 808.

Buyer requested listing information is shown at the confirmation of a viewing request, at 806, to presenting the information to the Buyer at 811, attending the viewing appointment (and subsequent deletion of the event from the Agent calendar) at 812, and at 813, and 814, respectively, entering and reviewing any comments (feedback) in the property viewed.

Some Buyers will propound offers to purchase, which at 809 can be reviewed by the Agent from the Agent desktop. In one embodiment, if the Buyer does not enter all the required information to generate a valid offer, the in complete offer may be displayed in the Agent desktop so that the Agent may contact the Buyer to request the additional information.

At 809A, the Agent has the functionality at the Agent desktop to view both detailed and summary information on the listings assigned to the Agent, as previously explained.

J. Transaction Coordinator (TC) Desktop and Event Scheduling

The TC provides a human interface to users interacting with the web site. The TC also provides an administrative capability to the Agents. In all real property transactions in this embodiment, the TC is preferably directly involved with assignment or review privileges, or is indirectly involved with event notifications. The TC is the first line of contact for users (Buyers and Sellers). The TC Desktop facilitates the operational aspects of the TC's function within the system.

The TC Desktop in this embodiment provides a set of Internet based applications that are substantially identical to that provided by the Agent Desktop, in that everything an Agent can do on the Agent Desktop, the TC can do on the TC Desktop. The TC Desktop differs from the Agent Desktop in that it has more applications. The bulk of these additional applications provide the capability of servicing events that have been generated by users (Buyers and Sellers) interacting with their accounts. These user-interaction generated events are categorized by the system and are placed in a visual "event log" in the TC Desktop. Depending on the type of event, the additional functionality to service the particular event is provided through informational links to specific application sets.

In the present embodiment, the following events are serviced as described below:

1) Call Back Event—A call back event is generated from the web site through a user account. The user can simply click on a 'Call Me' button, and an event is generated that creates a new record on a "call back" section of the event log. The event causes the system to send the TC an e-mail message indicating the request from the user, and to post the request to the TC Desktop. The event is considered to be "serviced" when the TC places a telephone call to the user who made the request. The call back is logged as 'called' by the TC entering a date time in an appropriate field on the log.

2) Seller Registration—When a seller interacts with the system's web site and submits a registration, this creates a new record on a "new sellers" section of the event log. The interaction also sends the area TC an e-mail message indicative of the registration and/or posts the event to the TC Desktop. The TC, on receipt of the e-mail message or viewing the posting on the Desktop, assigns the prospective listing to an Agent who is responsible for listings in the geographic area of the prospective listing. The TC Desktop has a display which indicates Agent availability information, so that duplicate appointments to solicit a listing contract are not made. The assignment event made by the TC causes an appointment event to appear in the Agent calendar. This appointment type must be confirmed as received by the Agent before the event is cleared from the TC event log.

3) Buyer Registration—When a Buyer interacts with the system's web site an submits a registration, an e-mail message is sent to the area TC and/or a message is displayed on the TC Desktop, and the registration information is inserted into the database. No event log entry exists for this event. In the present embodiment, an automatic reply is generated and sent as an e-mail message to the registering Buyer, welcoming the registering buyer as a new user.

4) Viewing Request—A Buyer can interact with the system's web site to create a viewing request, as previously explained. The viewing request consists of a list of each home that the Buyer wants to view, the preferred date and time for each appointment and an alternate date and time for each appointment. This information appears on a "viewing request" section of the event log on the TC Desktop. The viewing request event also causes the system to generate and send an e-mail message to the TC, and/or post a message to be displayed on the TC Desktop. In order to assign the viewing request appointment to an Agent, the TC must first determine the time availability of the properties requested by the Buyer to be viewed. In one embodiment, each such property is confirmed to be available for viewing by calling the listing agent or representative. This may be necessary when the property is listed with a broker other than the system operator where availability information is not already entered into the system database. When the list of available-for-viewing properties is completed, Agent time in one embodiment is assigned by the TC viewing a calendar of all agents in the TC's area of responsibility. From the viewing request event log, all information on the requesting Buyer is made available to the TC. The Buyer's account activity, Portfolio, viewing history and financing information is made to the TC for viewing. The generation of viewing appointment event, in one embodiment, optionally "pages" the Agent, wherein the system connects to a pager telephone number for a pager assigned to the particular Agent. This option, in one embodiment, may be manually activated by the TC if the appointment request occurs while the Agent is not logged on to the system through the Agent Desktop.

5) Appointment Assignment—An appointment assignment event appears on the event log in the appropriate section of the event log as soon as the TC verifies that the listings requested can be viewed and that an Agent has been assigned to the viewing appointment. The event stays in this event log section until a confirmation is received by the Agent. The viewing appointment assignment event causes a showing event to appear on the Agent calendar. This type of appointment must be manually confirmed by the Agent. When it is confirmed by the Agent, a confirmation event is sent to the TC and the assignment event on the event log is confirmed. Confirmation of this event causes the assignment event to drop from view on the Assignment section of the event log. The confirmation also causes an e-mail message to be generated and sent to the Buyer with the details of the appointment, including a list of the properties to be viewed and scheduled appointment times. Confirmation in other embodiments may include posting a message to the Buyer account for viewing during a Buyer session, or paging the Buyer, as previously explained.

6) "On Hold"—In the present embodiment, an "on hold" event is generated by the TC when a viewing request event is placed after regular business hours or the request confirmations otherwise cannot be made immediately. This is a holding place for viewing requests that will be completed at a later time.

7) Buyer Offer to Purchase—An offer event is generated, as explained earlier herein, by submitting an offer from a user (Buyer) web site account. The offer event appears in the event log in an "Offer" section. The offer to purchase event in the present embodiment is reviewed by the TC before any further disposition of the offer. The Agent assigned to the Buyer who placed the offer also receives a notification in the Agent's calendar of the offer. The notification contains a link to the offer review page for that Buyer. If modifications to the offer are required, they can be made on the review page. Any modification to the offer creates another event that notifies the Buyer of the modifications. Through the user account the Buyer can then review, approve and modify the offer. The completion of modification to the offer by the Buyer then begins the initial offer routing again. This process is repeated until the Agent approves the offer. The Agent then presents the offer to the listing agent. This can be done as an e-mail attachment, fax or hardcopy, as previously described, depending on the communications capability of the listing agent. If a counter offer is received from the listing agent, it is logged into the original offer through an offer review page on the Agent Desktop. The approval process continues in this manner until either the Buyer and Seller agree or it is determined that no contract will be formed.

8) SP Order—This event is generated, as previously explained, by the Buyer when the offer has been accepted, and closing services are ordered. The order appears in the event log on the TC Desktop. Each service order produces its own event in the event log. The service order can be reviewed for content and approved by the TC. Approval by the TC in this embodiment is needed before the service order is actually placed with the particular SP. The order is then placed by the TC by entry on the event log. The communications profile for the SP is displayed and the order is placed according to the information on the profile. For example, if the SP profile indicates that facsimile transmission of the order is needed, then the order is placed by the system using the telephony server. If the profile calls for a telephone order, the TC places the order on behalf of the Buyer by telephone call. The order may also be placed by e-mail message generated by the system, either as a message, or as a file attachment having a particular order form attached as a PDF file. When the order is placed a time/date stamp is entered into the event log for that order.

9) SP Status—This event, in the present embodiment, is generated in one of two ways. If the communications profile of the SP supports EDI (electronic data interchange) then this event is generated by the system when it receives an status update for the Buyer account. This event can then be reviewed by the TC. The TC can release the order status for viewing by the Buyer. If the status is received by manual methods (telephone conversation, facsimile etc.) then the TC can enter a service order status update through the event log and release it for viewing by the Buyer.

10) Closing—Although a closing event is set when an Offer is accepted and a contract is formed, the timing of the closing event can be adjusted by the TC according to information received, for example, from the SP's order status. Closing events generate an alarm indicator that can be set by the TC. The alarm consists of a time setting that can be adjusted from 5 days to 1 day prior to the scheduled date of the closing. An alarm is triggered by comparing the alarm date to the system clock (done in this embodiment each time the event log is refreshed or when the TC logs on to the TC Desktop). If a closing alarm is activated, in this embodiment a popup browser window with the closing information in it is presented on the TC Desktop. An e-mail message is also generated and sent to the TC. Closing events are deleted by the system when the closing date has passed and the TC has checked a corresponding "verify event" box in the event log.

Each event category has additional interface requirements as outlined in the preceding event descriptions. In some cases, handling of a particular type of event will generate another event which is intended for disposition by another person in the sale transaction process. Typically, events are handled and distributed by the TC for the Agent and users.

K. Market Manager Desktop and Inventory Management

For each market, in the present embodiment a designated manager of real estate operations (MDM) has a Desktop which includes substantially the same functionalities (applications programs) as the TC for the particular market. The MDM Desktop is accessible from the broker's web site, just as all the other users in the system according to the invention, so that the MDM may perform his tasks in the system irrespective of his physical location.

In addition to the TC-equivalent applications, the MDM Desktop in this embodiment has available applications to monitor listing inventory, Agent activity and TC activity. From the MDM Desktop a "Listing Inventory" can be viewed. The Listing Inventory can be shown for a period of time that the MDM selects, for example, month to date, last month, last quarter, year to date. In the Listing Inventory information, the identities of the TC and the Agent responsible for each particular property listing are presented. The TC and Agent presentations provide links to an additional information page, which in this embodiment is a summary of activity for the particular Agent over the same period of time that the Inventory page is presented.

In the present embodiment, information on the listing page is typically confined to the property identification, its physical address, the owner's name, the TC and Agent responsible for the property listing, the property's original asking price, the actual sale (contract) price, and the closing date of the transaction. Additional information on each property listing in the present embodiment is linked to appropriate web pages through each of the listing information items. The physical address, for example, can be linked to a page which includes the details of the property. The owner name, as another example, can be linked to a page with the detailed personal information about the property owner, including contact information. The TC identity can be linked to a page of information about the TC's activities. Similarly, links to the Agent's activity pages can be displayed. The closing date can be linked to a page that shows the closing location, the service providers (SPs) used in the transaction and the status of each service ordered. Page links from this MDM page can display estimated closing costs and any documentation available, including the offer documentation, and service orders.

Information on individual Agents and TCs is available to the MDM. Through a broker's organization directory, for example, each Agent's or TC's activities can be monitored. For an Agent, selected period of time statistics on the number of listings, number of Buyers, number of showings and number of closings can be presented. Further statistics present minimum and maximum values for listing prices, sale prices, number of showing appointments per day (or any other suitable selected interval), listing days on market and Buyer days. For any TC in the particular market, the selected period statistics that are presented to the MDM can include the number of listings, number of Buyers, number viewing requests, number of closings and service orders. Further statistics on event handling is available for review on the MDM Desktop, including minimum, maximum and average time for event handling, sorted by event category.

L. Market Management

Brokerage management and market information is the focus of the Market Management Desktop. Property listing inventory for each market can be reviewed along with closing inventories of listed properties. Regional and global rollups of this information are also available through the MDM Desktop. Drill-down capabilities for each market, each Agent, and each TC are also available as they are in the MDM Desktop.

Market performance measurements can be viewed for individual markets. Regional and global measurements are also available. These global measurements concern themselves with client capture costs, acquisition sources, and conversion rates. These statistics are supported by information gathered by the system through account details and site activities. Primarily, for each Buyer in a particular market, account information such as the registration date, logon frequency, searches requested by each Buyer, properties in each portfolio, an average price of the properties in each Buyer's portfolio, a method of acquisition, a number of viewing requests, a closing date, and an average sale price are provided for review by the MDM.

By providing roll ups of listing and transaction data to the MDM on the MDM desktop, the system can provide the MDM with tools to facilitate transactions in each market. For example, if an amount of time from the date each property is listed as offered for sale to the actual closing appears to be is excessive, the MDM may wish to suggest to each Seller that the asking price of each Seller's property may be reduced. As another example, the MDM may wish to review comments provided by property-viewing Buyers to determine whether a particular subdivision in the market is particularly attractive or is less attractive to prospective purchasers, and suggest to the Sellers in such subdivisions any needed upgrades in appearance of the properties therein. Alternatively, based on the comment review the MDM may suggest to any homeowners association or subdivision management changes that could be made to public areas in the subdivision to enhance purchaser appeal.

Figure 10:
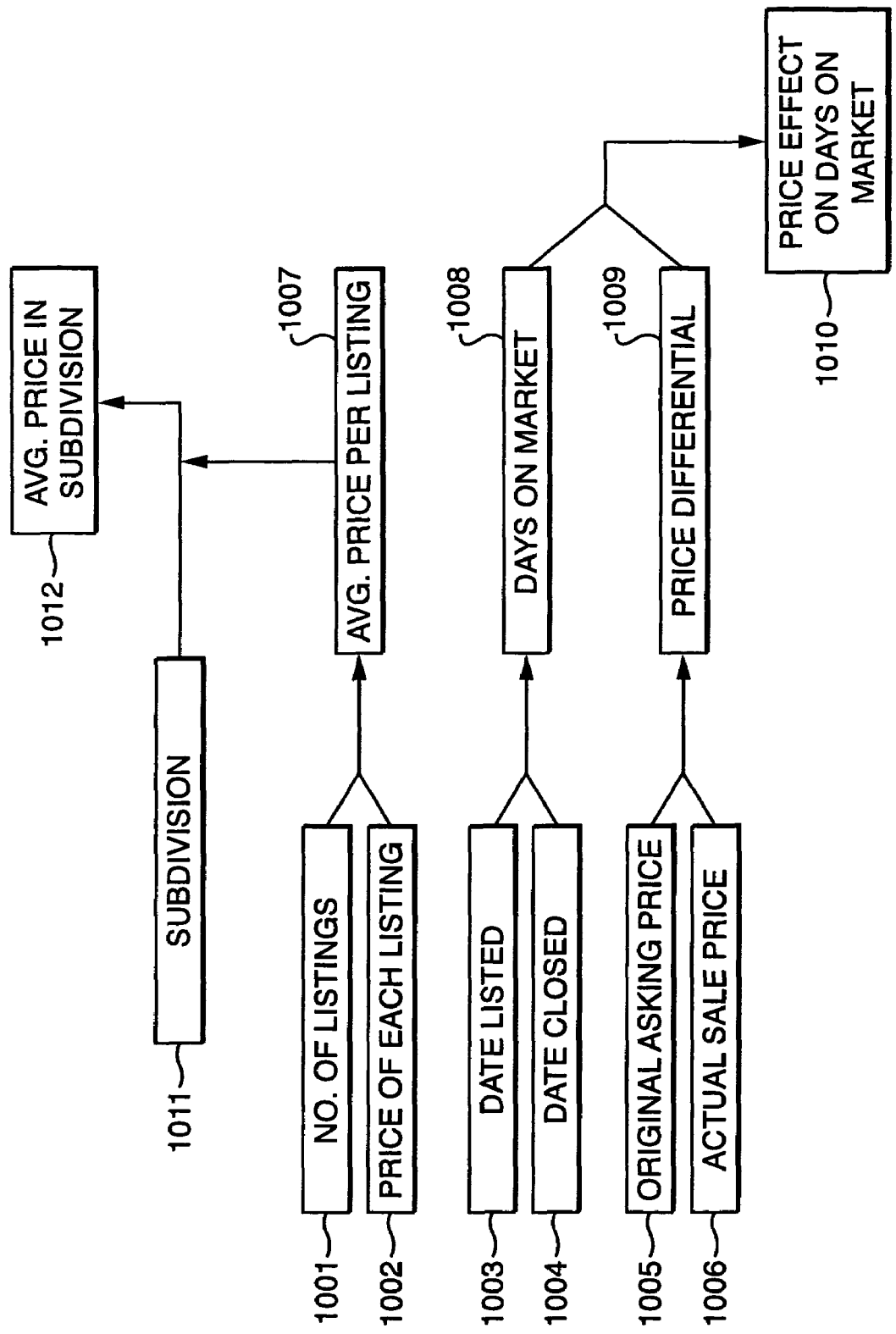
FIG. 10 shows an example of data management available through a Market Development Manager desktop in one embodiment of the invention.

An example of the types of data available to the MDM through the MDM Desktop is shown in FIG. 10. During the selected time interval, a number of listings, at 1001 can be presented with the price of each listing, at 1002, to provide an average price per listing at 1007. The average price information can be discretized by subdivision, at 1011, to provide, for example, an average price in each subdivision, at 1012. A date each property is listed as offered for sale, at 1003, can be measured against the closing date of each same property, at 1004, to provide an indication of days on the market, at 1008. The days on the market can be evaluated with respect to original asking price 1005 for each listing, and the actual sale price thereof, at 1006, to develop a relationship, at 1010, between price changes, at 1009, and number of days on the market 1008.

M. Administration

The system in this embodiment of the invention has several facilities to initialize and configure particular functionality and features. These include new market administrative functions, new user administration, account administration, listing and exclusive listing administration.

"New market administration" provides functionality to an administrator, or other designated individual, to set up the system to initiate business in a new market. This functionality includes all of the references that appear on the site that are market specific. During the set up a number of data fields are entered including the market name, location of all market specific graphics, the name of the market MLS database and associations, the name of a MDM assigned to the market and the electronic mail address lists for automated e-mail messages.

Once a market is set up, any of these parameters can be edited to add features. E-mail lists, for example, can be extended when additional TCs or Agents are assigned to the new market. Typically extensions or additions would only be necessary if data sources changed.

The new users administration in this embodiment is confined to defining the various user roles within the system, the functionality and features each role has permission to execute, and role assignment to new users. Typical roles, as previously explained, include Buyer, Seller, Agent, Transaction Coordinator, Market Development Manager and Administrator. Role functionality is assigned to each role through an interface that allows the Administrator to add or delete permission to use the various functionalities in the system. Functionality is added through an interface that assigns a URL to a button, an icon and a location in the existing hierarchy of functionality. Parent and child relationships can be constructed from this interface in order to group functions. Finally a new user can be added with a particular role. Particulars about the user are required at initiation. This information includes name, location contact numbers, and the role that the user plays. Buyers and Sellers are automatically added through the web site in the manner previously explained herein, but employees of the broker's organization must be added through this interface. Once a user has been assigned a role, additional functionality can be added to the user specifically through the same interface. This feature provide the Administrator with the flexibility to add new employees, or change the roles of the various employees when their duties in the broker's organization change. Similarly, functionality can be deleted.

Buyers and Sellers accounts can be administered through an interface that allows access to the Administrator or the market TC. Information contained in a Buyer or Seller account can be edited by the Administrator or TC from this interface. Occasionally an e-mail address or phone number change is required, and this interface makes it easy for the TC and/or Administrator to make such changes. Account specifics such as search criteria, portfolio contents, and offer and closing information can be viewed and edited through this interface by the TC and/or Administrator.

A facility to enter and edit property listings is also provided in this embodiment. Each property listing's associated information is market specific, because particular data are available in some markets and not in others, by local custom and/or regulation imposed by the state or municipality. The specific information required for each market is contained in a dictionary table in the database. This dictionary table translates the market specific information into the common data model used in the database. Through this dictionary, an interface of market specific data fields is constructed for entry and editing. Market consistency and standards for each market are preserved with this method. Information categories are grouped by particular data elements, and these elements are presented in category groups. Each data element may be "free form" entry or the entry may have a limited number of valid alternatives for entry. In the case of limited alternatives, each data element will contain a list of valid entries for that market and data element. These valid entries are also contained in a dictionary table that is keyed by market and by category. A listing entry also contains the path to graphics files that are to be included in listing displays.

An additional interface is provided in this embodiment to add information and graphic materials for "exclusive" listings. An exclusive listing is one that is differentiated from other types of property listings by the fact that the broker using the system of the invention is the broker offering the property for sale on behalf of the owner. In the present embodiment, an exclusive listing can include additional information on the listed property which may exceed the typical information resident in the MLS database. For example, additional photos of the home may be uploaded to the system, along with scanned copies of any required disclosures, and a survey of the property made by a registered surveyor. An interface that allows a TC in the particular market to upload images of each of these types of additional materials is provided in this embodiment.

The invention has been described in terms of specific embodiments. Those skilled in the art will devise other embodiments which do not depart from the spirit of the invention as disclosed herein. Accordingly, the invention shall be limited in scope only by the attached claims.

What is claimed is:

1. A system for managing a real estate transaction, comprising:
 a database configured to:
 store property data for each of a plurality of properties listed as offered for sale by a user identified as a broker,
 store at least a name, a method of contact, and a search criteria for a user identified as a buyer, and
 store at least a name, a method of contact and an address of a property listed for sale for a user identified as a seller; and
 an application server operatively coupled to a database configured to:
 query the database and determine whether any of the plurality of properties match the search criteria for the user identified as the buyer,
 store a first result of the query,
 after the database has been updated, re-query the database using the search criteria to obtain a second result, wherein the second result comprises data not present in the first result for at least one of the plurality of properties, generate a message for transmission to the user identified as the buyer based on the second result.

2. The system as defined in claim 1 wherein the application server is configured to generate and transmit a message to an agent by at least one of posting a message to a terminal, generating an electronic mail message and sending to an agent e-mail account and generating a pager message, the message notifying the agent of a request to view a selected property entered by the user identified as the buyer.

3. The system as defined in claim 1 wherein the message for transmission comprises at least one of posting to a web page accessible to the user identified as the buyer, sending an electronic mail message to the user identified as the buyer and dialing a pager telephone number.

4. The system as defined in claim 1 wherein the application server is configured to indicate to the user identified as the seller at least a number of properties having data thereon in the database matching a criterion selected by the user identified as the seller.

5. The system as defined in claim 4 wherein the selected criterion comprises at least one of sales price and geographic location of the property listed by the user identified as the seller.

6. The system as defined in claim 1 wherein the application server is configured to post picture files from the database to a terminal accessible to the user identified as the buyer of properties selected thereon by the user identified as the buyer for viewing thereof.

7. The system as defined in claim 1 wherein the application server is configured to: enable the user identified as the seller to enter data including at least the address for the property to be listed as offered for sale on an Internet connected terminal; transfer the user-entered data to the database;
 search the database for complementary listing data on the property to be listed; and
 display data entry fields to the user identified as a seller, the data entry fields comprising elements of the complementary listing data not found for the property in the database.

8. The system as defined in claim 7 wherein the complementary listing data for the property comprises at least one selected from a structure area, a number of bedrooms, a number of bathrooms, a total number of rooms and a number of garage spaces.

9. The system as defined in claim 7 wherein the complementary listing data comprises at least one selected from a school district, real property taxes, and a subdivision in which the property is located.

10. The system as defined in claim 1 wherein the application server is configured to provide a secure web page to a user, wherein the secure web page comprises links to the database for matching listings, whereby the user is provided direction to access detailed information on each one of the plurality of properties listed that match the search criteria,
 wherein the user is one selected from the group consisting of the user identified as the buyer, the user identified as the seller, and the user identified as the broker.

11. The system as defined in claim 10 comprising initiating a user account for the user prior to making the links available to the user, whereby the user is granted access to the secure web page, the user account comprising personal information about the user including at least a name and a password for subsequent access to the account by the user.

12. The system as defined in claim 1 wherein the application server is configured to update the database; search the database; and generate an e-mail message subsequently transmitted to the user including therein at least a quantity of any such listings which match the search criteria, if a property listing added to the database matches the search criteria.

13. A system for managing a real estate transaction, comprising:

means for storing property data for each of a plurality of properties listed as offered for sale by a user identified as a broker, means for storing at least a name, a method of contact, and a search criteria for a user identified as a buyer, means for storing at least a name, a method of contact and an address of a property listed for sale for a user identified as a seller;

means for querying the database and determine whether any of the plurality of properties match the search criteria for the user identified as the buyer, means for storing a result of the query, after the database has been updated, means for re-querying the database using the search criteria to obtain a second result, wherein the second result comprises data not present in the first result, for at least one of the plurality of properties, means for generating a message for transmission to the user identified as the buyer based on the second result.

* * * * *